United States Patent
Xiao

(10) Patent No.: US 9,825,854 B2
(45) Date of Patent: Nov. 21, 2017

(54) HOST ARCHITECTURE FOR EFFICIENT CLOUD SERVICE ACCESS

(71) Applicant: Nicira, Inc., Palo Alto, CA (US)

(72) Inventor: Jun Xiao, Beijing (CN)

(73) Assignee: NICIRA, INC., Palo Alto, CA (US)

( * ) Notice: Subject to any disclaimer, the term of this patent is extended or adjusted under 35 U.S.C. 154(b) by 665 days.

(21) Appl. No.: 14/228,223

(22) Filed: Mar. 27, 2014

(65) Prior Publication Data

US 2015/0281059 A1    Oct. 1, 2015

(51) Int. Cl.
*H04L 12/741*    (2013.01)
*H04L 29/12*    (2006.01)
*G06F 9/455*    (2006.01)

(52) U.S. Cl.
CPC .......... *H04L 45/74* (2013.01); *G06F 9/45558* (2013.01); *H04L 61/2532* (2013.01); *H04L 61/2535* (2013.01); *G06F 2009/45595* (2013.01); *H04L 61/2514* (2013.01); *H04L 61/2517* (2013.01)

(58) Field of Classification Search
CPC . H04L 45/74; H04L 61/2514; H04L 61/2517; H04L 61/2532; H04L 61/103; H04L 61/2535; H04L 61/2557; H04L 47/70; H04L 67/2819; G06F 2009/45595; G06F 9/45558

See application file for complete search history.

(56) References Cited

U.S. PATENT DOCUMENTS 6,331,984 B1    12/2001 Luciani
6,353,614 B1     3/2002 Borella et al.
6,651,096 B1    11/2003 Gai et al.
7,379,465 B2     5/2008 Aysan et al.
7,512,744 B2     3/2009 Banga et al.
7,742,398 B1     6/2010 Tene et al.
(Continued)

FOREIGN PATENT DOCUMENTS

EP           2748714         7/2014
WO    WO 2008/095010         8/2008
(Continued)

OTHER PUBLICATIONS

U.S. Appl. No. 14/228,220, filed Mar. 27, 2014, Xiao, Jun.
(Continued)

*Primary Examiner* — Kevin Bates
*Assistant Examiner* — Ranjan Pant
(74) *Attorney, Agent, or Firm* — Adeli LLP

(57) ABSTRACT

A method for a host machine that hosts at least one tenant virtual machine (VM) of a particular tenant logical network that accesses service VMs of a particular service logical network. The method, prior to a packet being received at a PFE on the host, intercepts the packet that sent by the tenant VM to one of the service VMs based on a set of forwarding rules. The packet includes a source IP address and a source port number of the tenant VM. The method, prior to the packet leaving the PFE in the host, replaces the source IP address and source port number with a replacement IP address and port number pair from a set of replacement IP address and port number pairs allocated to the host for accessing service VMs. The method sends the modified packet to the PFE to forward the modified packet to the service VM.

20 Claims, 28 Drawing Sheets

(56) References Cited

U.S. PATENT DOCUMENTS

| | | | |
|---|---|---|---|
| 7,818,452 | B2 | 10/2010 | Matthews et al. |
| 7,948,986 | B1 | 5/2011 | Ghosh et al. |
| 8,190,767 | B1 | 5/2012 | Maufer et al. |
| 8,194,674 | B1* | 6/2012 | Pagel ............... H04L 12/4641 370/393 |
| 8,259,571 | B1 | 9/2012 | Raphel et al. |
| 8,913,611 | B2 | 12/2014 | Koponen et al. |
| 9,148,414 | B1* | 9/2015 | Roth ..................... H04L 63/08 |
| 9,160,707 | B2* | 10/2015 | Ludwig ............. H04L 12/1485 |
| 9,185,069 | B2 | 11/2015 | Koponen et al. |
| 9,264,313 | B1 | 2/2016 | Manuguri et al. |
| 2002/0186698 | A1* | 12/2002 | Ceniza ............... H04L 12/4641 370/401 |
| 2003/0026258 | A1 | 2/2003 | Takatani et al. |
| 2003/0093481 | A1 | 5/2003 | Mitchell et al. |
| 2004/0193677 | A1* | 9/2004 | Dar .................. H04L 29/12113 709/203 |
| 2004/0246991 | A1 | 12/2004 | Tsuzuki et al. |
| 2004/0252683 | A1 | 12/2004 | Kennedy et al. |
| 2006/0031407 | A1* | 2/2006 | Dispensa ......... H04L 29/12009 709/219 |
| 2007/0061492 | A1 | 3/2007 | van Riel |
| 2007/0101323 | A1 | 5/2007 | Foley et al. |
| 2007/0294421 | A1 | 12/2007 | Octaviano et al. |
| 2008/0049752 | A1* | 2/2008 | Grant ................ H04L 12/4641 370/392 |
| 2008/0072305 | A1 | 3/2008 | Casado et al. |
| 2008/0183853 | A1* | 7/2008 | Manion ............. H04L 12/4641 709/223 |
| 2008/0186990 | A1* | 8/2008 | Abali ................ G06F 9/45558 370/419 |
| 2008/0298274 | A1 | 12/2008 | Takashige et al. |
| 2009/0129271 | A1 | 5/2009 | Ramankutty et al. |
| 2009/0235325 | A1 | 9/2009 | Dimitrakos et al. |
| 2010/0115080 | A1* | 5/2010 | Kageyama ........ H04L 29/12028 709/223 |
| 2010/0318665 | A1 | 12/2010 | Demmer et al. |
| 2011/0026537 | A1* | 2/2011 | Kolhi ................ H04L 12/4633 370/401 |
| 2011/0107331 | A1 | 5/2011 | Evans et al. |
| 2011/0317703 | A1* | 12/2011 | Dunbar .............. H04L 12/462 370/392 |
| 2013/0033993 | A1 | 2/2013 | Cardona et al. |
| 2013/0073743 | A1 | 3/2013 | Ramasamy et al. |
| 2013/0103834 | A1 | 4/2013 | Dzerve et al. |
| 2013/0148542 | A1 | 6/2013 | Zhang et al. |
| 2013/0148543 | A1 | 6/2013 | Koponen et al. |
| 2013/0151661 | A1* | 6/2013 | Koponen ................ H04L 47/12 709/217 |
| 2013/0227550 | A1 | 8/2013 | Weinstein et al. |
| 2013/0239198 | A1 | 9/2013 | Niemi |
| 2013/0276093 | A1* | 10/2013 | Xie ..................... H04L 63/029 726/13 |
| 2013/0332983 | A1 | 12/2013 | Koorevaar et al. |
| 2014/0003249 | A1* | 1/2014 | Cai ....................... H04L 43/10 370/241 |
| 2014/0052877 | A1* | 2/2014 | Mao .................... H04L 61/103 709/245 |
| 2014/0059226 | A1* | 2/2014 | Messerli .............. G06F 9/546 709/226 |
| 2014/0059544 | A1 | 2/2014 | Koganty et al. |
| 2014/0115578 | A1 | 4/2014 | Cooper et al. |
| 2014/0195666 | A1 | 7/2014 | Dumitriu et al. |
| 2015/0003453 | A1 | 1/2015 | Sengupta et al. |
| 2015/0026345 | A1* | 1/2015 | Ravinoothala ........ H04L 47/125 709/226 |
| 2015/0081861 | A1 | 3/2015 | Koponen et al. |
| 2015/0098360 | A1 | 4/2015 | Koponen et al. |
| 2015/0188773 | A1* | 7/2015 | DeCusatis .......... G06F 9/45558 370/254 |
| 2015/0281060 | A1 | 10/2015 | Xiao |
| 2015/0281171 | A1 | 10/2015 | Xiao |

FOREIGN PATENT DOCUMENTS

| | | |
|---|---|---|
| WO | WO 2013/074842 | 5/2013 |
| WO | PCT/US2014/072889 | 12/2014 |
| WO | WO 2015/147943 | 10/2015 |

OTHER PUBLICATIONS

U.S. Appl. No. 14/228,225, filed Mar. 27, 2014, Xiao, Jun.

International Search Report and Written Opinion of PCT/US2014/072889, Jun. 22, 2015 (mailing date), Nicira, Inc.

Author Unknown, "Enabling Service Chaining on Cisco Nexus 1000V Series," Month Unknown, 2012, 25 pages, Cisco.

Borella, Michael, et al., "Distributed Network Address Translation," Oct. 1998, pp. 1-24, 3Com Corp.

Casado, Martin, et al., "SANE: A Protection Architecture for Enterprise Networks," Proceedings of the 15th USENIX Security Symposium, Jul. 31, 2006, 15 pages.

Dixon, Colin, et al., "An End to the Middle," Proceedings of the 12th conference on Hot topics in operating systems USENIX Association, May 2009, pp. 1-5, Berkeley, CA, USA.

Dumitriu, Dan Mihai, et al. U.S. Appl. No. 61/514,990, filed Aug. 4, 2011.

Guichard, J., et al., "Network Service Chaining Problem Statement; draft-quinn-nsc-problem-statement-00.txt," Jun. 13, 2013, pp. 1-14, Cisco Systems, Inc.

Joseph, Dilip Antony, et al., "A Policy-aware Switching Layer for Date Centers," Jun. 24, 2008, 26 pages, Electrical Engineering and Computer Sciences, University of California, Berkeley, CA, USA.

Sekar, Vyas, et al., "Design and Implementation of a Consolidated Middlebox Architecture," In Proc. of NSDI, Month Unknown, 2012, 14 pages.

Sherry, Justine, et al., "Making Middleboxes Someone Else's Problem: Network Processing as a Cloud Service," In Proc. of SIGCOMM, Aug. 13-17, 2012, 12 pages, Helsinki, Finland.

Zheng, Linfeng John, "Host-initiated NAT; draft-zheng-host-initiated-nat-01.txt," Mar. 30, 2011, pp. 1-7.

\* cited by examiner

HOST ARCHITECTURE FOR EFFICIENT CLOUD SERVICE ACCESS

BACKGROUND

Cloud services are often assigned with public (or Internet routable) IP addresses, which can be accessed from clients either in or out of the cloud. The tenants' clients inside the cloud are often assigned with private IP addresses (i.e., IP addresses that are not routable for traversing the Internet). The private IP addresses are selected from specific IP address ranges that are reserved for private use. Devices with private IP addresses cannot directly connect to outside of the network on which the IP addresses are used (i.e., the tenant's logical network). Similarly, devices outside of the local network cannot directly connect to devices with private IP addresses. Access to and from a device with private IP address requires network address translation (NAT) into public Internet routable IP addresses.

There are two ways for tenants' clients to access cloud services. One floating IP address can be assigned to each virtual machine (VM), i.e., a 1:1 NAT. This method allows a client VM to directly access cloud services but is expensive because it requires one floating IP address per VM.

Alternatively, one NAT gateway can be used per tenant logical network. This approach requires that client initiated communication go through the NAT gateway, which would become a bottleneck when the network input/output (I/O) is intensive. FIG. 1 illustrates a portion of a prior art virtualized infrastructure domain. As shown the virtualized infrastructure domain includes several hosts 101-104.

Each host 101-104 includes a hypervisor 111-114, respectively. The VMs for several tenants T1-Tn and several services S1-Sn are hosted on hosts 101-104. For instance, VMs T1-1, T1-2, and T1-3 for tenant T1 are hosted on hosts 101, 102, and 104, respectively. Similarly, VMs S1-1 and S1-2 are hosted on hosts 101 and 102, respectively.

The VMs T1-1, T1-2, and T1-3 of tenant T1 form a logical network. The logical network is identified by a logical network identifier (also known as virtual network identifier or VNI) and includes a NAT gateway 150. In order for the VMs of tenant T1 to access VMs of service S1, the communication packets have to travel through NAT gateway 150 (as shown by paths 140-147 identified by bold arrows), which creates a bottleneck. In addition, although T1-1 and S1-1 are on the same host 101, packets sent from T1-1 has to through gateway 150 in order to reach S1-1.

BRIEF SUMMARY

Some embodiments provide a method that allows the use of private (i.e., not routable for traversing the Internet) IP addresses for accessing shared cloud services by multiple tenant logical networks. The method only consumes a limited number of private IP addresses while achieving high efficient cloud service access. Some embodiments maintain a pool of private IP address and port number pairs. Each IP address port number pair is unique and is used to identify a particular tenant VM that requires efficient access to shared cloud services.

The method of some embodiments performs a source network address translation (SNAT) on packets that are sent from the tenant VM to a service VM. The SNAT replaces the source IP address and the port number of the tenant VM (which may not be unique across multiple tenant logical networks) in a packet with a pair of replacement IP address and replacement port numbers that are unique among all tenant logical networks that utilize a virtualized infrastructure domain to access the cloud service. The packet is then sent to the destination service VM without going through a NAT gateway. The VM's IP address and the replacement IP address are both private IP addresses. However, as opposed to the private IP address and port number pair of a VM that is assigned for the VM's tenant logical network and may be the same as an IP address and port number pair of another VM on a different tenant logical network (since the tenant logical networks are not aware of the private addresses of each other), the replacement IP address and port number pairs are defined by a controller that ensures the uniqueness of each replacement IP address and port number across multiple tenant logical networks.

When the requesting tenant VM and the requested cloud service VM are not on the same host, the packet is sent through a tunnel between the two hosts. When the requesting tenant VM and the requested cloud service VM are on the same host, the packet is sent from the physical forwarding element (e.g., a virtual switch) of the host to the virtual port of the requested service VM. In either case, performing the NAT on the tenant VM host avoids the NAT gateway bottleneck.

Some embodiments provide a method for coordinating distributed network address translation (NAT) in a network within which several logical networks are implemented. The method, in some embodiments, is implemented by a controller or a network address allocator. The logical networks include several tenant logical networks and at least one service logical network that include service VMs that are accessed by VMs of the tenant logical networks. The method defines a group of replacement IP address and port number pairs. Each pair can be used to uniquely identify a VM across all of the tenant logical networks. The method sends to at least one host that is hosting a VM of a particular tenant logical network (for which access is requested to a particular service logical network), a set of replacement IP address and port number pairs. Each replacement IP address and port number pair that is sent to a host can be used by the host to replace a source IP address and a source port number in a packet that is destined from the VM of the particular tenant logical network to a VM of the particular service logical network.

Some embodiments provide a physical computing device that operates in a network that includes a group of tenant VMs and a set of service VM. The computing device includes a set of machine readable media that store a physical forwarding element (PFE) and a network address translation (NAT) agent.

The NAT agent intercepts a packet that is sent by a tenant VM to one of the service VMs based on a set of forwarding rules that specify when to intercept packets to service VMs based on the destination IP address of the packets. The packet includes a source IP address and a source port number of the tenant VM. The NAT agent, prior to the packet leaving the PFE, replaces the source IP address and the source port number with a replacement address and port number from a set of replacement IP address and port number pairs that are allocated to the host for accessing service VMs. The NAT agent sends the modified packet to the PFE for forwarding the modified packet to the service VM.

Some embodiments provide a method of efficient access to a set of service VMs in a network that includes a group of tenant logical networks, a set of service logical networks, and a set of hosts. Each tenant logical network includes a set of VMs of one tenant of a group of tenants. Each service logical network includes a set of VMs of one service in a set of services. The method, at a host in the set of hosts, intercepts a packet that is sent by a particular VM of a tenant logical network to a VM of a service logical network. The packet includes a source IP address and a source port number that is associated with the particular VM. The packet is intercepted prior to leaving the PFE in the host. The PFE is used to receive packets from and send packets to the VMs hosted on the host. The method, at the host, replaces the source IP address and the source port number in the packet with a replacement IP address and port number pair from a set of replacement IP address and port number pairs. Each pair can be used to uniquely identify a VM across the group of the tenant logical networks. The method sends the packet through the PFE to the VM of the service logical network.

Some embodiments provide a method for a host machine that hosts at least one tenant VM of a particular tenant logical network that accesses service VMs of a particular service logical network. The method, prior to a packet being received at a PFE on the host, intercepts the packet that sent by the tenant VM to one of the service VMs based on a set of forwarding rules. The packet includes a source IP address and a source port number of the tenant VM. The method, prior to the packet leaving the PFE in the host, replaces the source IP address and source port number with a replacement IP address and port number pair from a set of replacement IP address and port number pairs allocated to the host for accessing service VMs. The method sends the modified packet to the PFE to forward the modified packet to the service VM.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method that allows the use of private IP addresses for accessing shared cloud services by multiple tenant logical networks. A network address allocator maintains a pool of private IP address and port number pairs. Each IP address and port number pair in the pool is unique and is used to identify a particular tenant VM that requires access to shared cloud services. The network address allocator is a centralized controller that allocates the replacement IP address and port numbers to tenant's VM in different logical networks. Although the replacement IP addresses are private IP addresses, the network address allocator guarantees that the replacement IP address and port number pairs that are assigned to different VMs of different logical networks are unique.

Figure 2:
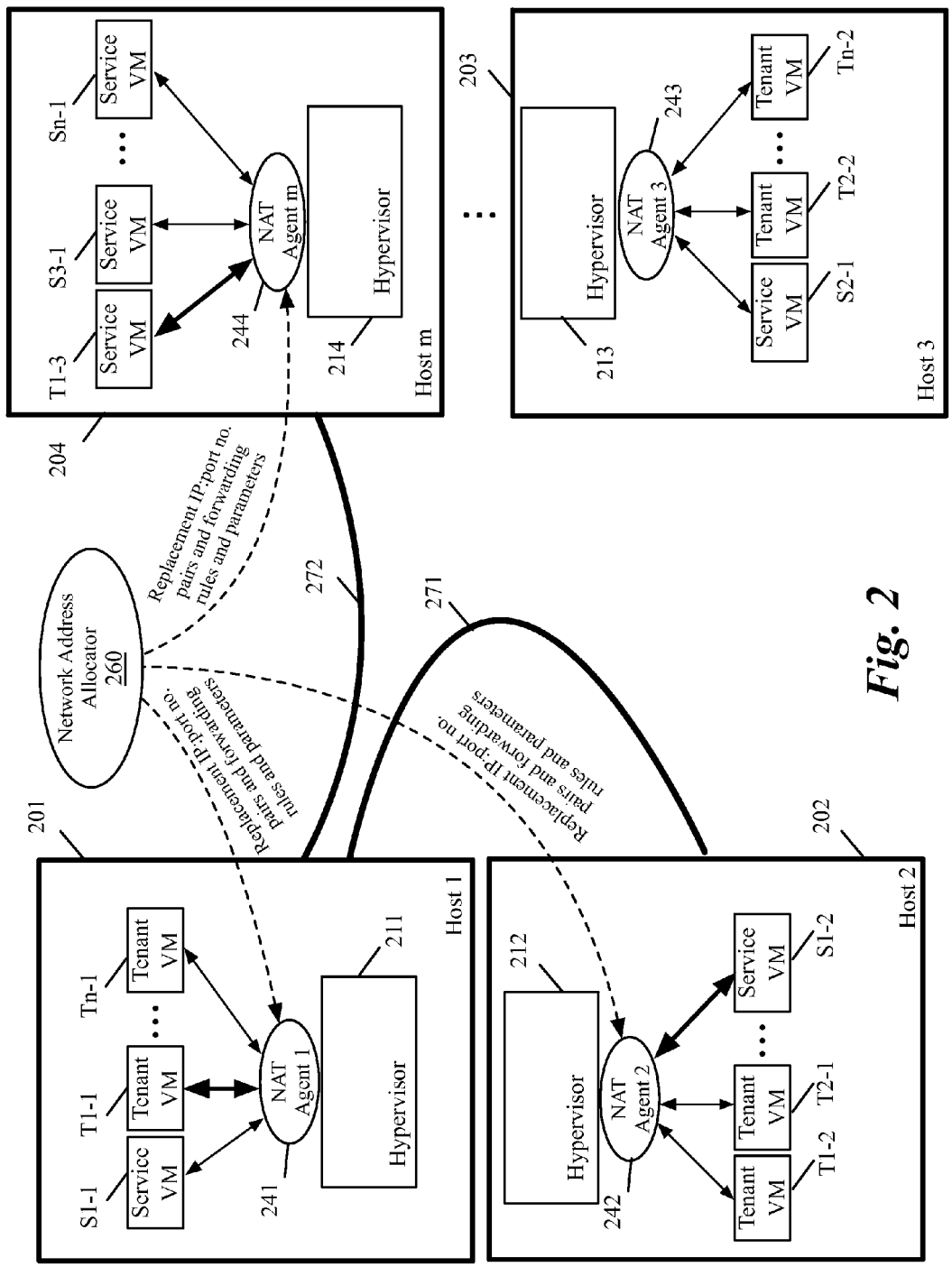
FIG. 2 conceptually illustrates a virtualized infrastructure domain in some embodiments of the invention.

FIG. 2 conceptually illustrates a virtualized infrastructure domain in some embodiments of the invention. The virtualized infrastructure domain is in some embodiments a virtualized infrastructure that is managed by a single cloud management system. The virtualized infrastructure domain includes a set of host machines hosting multiple tenants. Each tenant has one or more VMs. The host machines also host a set of services that provide different services. The term cloud service refers to services (such as computing, storage, etc.) provided in a distributed manner over a network.

As shown, the virtualized infrastructure domain includes several hosts 201-204. Each host 201-204 includes a hypervisor 211-214, respectively. The hypervisors shown in this figure are representative of the various types of virtualization software that may operate on hosts in such a virtualized infrastructure (e.g., virtual machine monitor, etc.). In some embodiments, this virtualization software represented by the hypervisors 211-214 includes a physical forwarding element such as a virtual switch. The VMs for several tenants T1-Tn and several services S1-Sn are hosted on hosts 201-204. For instance, VMs T1-1, T1-2, and T1-3 for tenant T1 are hosted on hosts 201, 202, and 204, respectively. Similarly, VMs S1-1 and S1-2 are hosted on hosts 201 and 202, respectively. The VMs T1-1, T1-2, and T1-3 of tenant T1 form a logical network (also referred to as private network or virtual network). The logical network is identified by a logical network identifier (also known as virtual network identifier or VNI). Each logical network is configured by a tenant. As shown in FIG. 2, each host 201-204 hosts multiple tenants. The VMs of a cloud service (e.g., S1-1 and S1-2) also form a logical network. In addition, each host 201-204 can also host multiple VMs of the same tenant or the same service.

In some embodiments, cloud services are specific tenants in the virtualized infrastructure domain to which other tenants of the virtualized infrastructure domain can have efficient access by using the distributed NAT techniques described in this specification. The cloud services are logical networks on the same virtualized infrastructure domain as the tenant logical networks that access them. Multiple tenant logical networks access a shared cloud service within the virtualized infrastructure domain.

Figure 1:
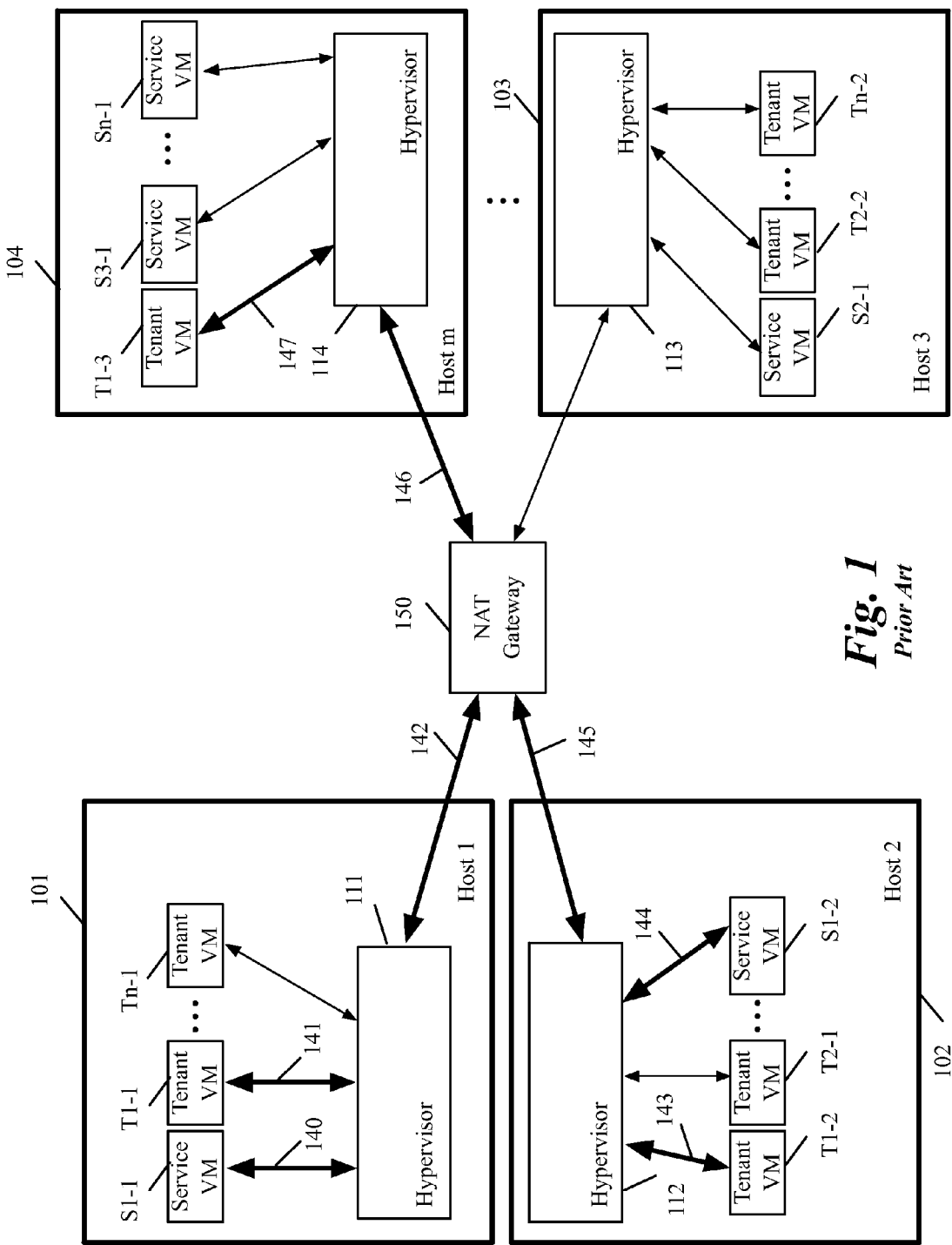
FIG. 1 illustrates a portion of a prior art virtualized infrastructure domain.

Some embodiments allow a tenant to enable an efficient way of accessing the cloud services. In the example of FIG. 2, tenant T1 has enabled efficient access to service S1. As a result, the packets exchanged between tenant T1's VMs (i.e., T1-1, T1-2, and T1-3) and service S1's VMs (i.e., S1-1 and S1-2) do not pass through a gateway (such as gateway 150 in FIG. 1). Instead, the packets exchanged between a tenant VM and a service VM that are not on the same host are exchanged through a tunnel between the corresponding two hosts. For instance, packets exchanged between T1-1 VM on host 201 and service S1-2 on host 202 are exchanged through tunnel 271. Similarly, packets exchanged between T1-3 on host 204 and S1-1 on host 201 are exchanged through tunnel 272. As described further below, the packets exchanged between a tenant VM and a service VM that are the same host are exchanged between the two VMs through a physical forwarding element of the common host without leaving the host at all.

As shown, the virtualized infrastructure domain includes a network address allocator (or controller) 260. In addition, each host 201-204 includes a network address translation (NAT) agent 241-244, respectively. Once a tenant activates efficient access to a particular service, the network address allocator sends pairs of replacement (or fake) network address and port numbers as well as a set of parameters and rules to the host machines that host any of the requesting tenant's VMs. In addition, the network address allocator in some embodiments sends the replacement network address: port number pairs to the host machines that host any of the requested service's VMs (even when the hosts do not host any of the requesting tenant's VMs). This allows the NAT agents in those hosts to identify the packets that are sent from the VMs of the tenants that have enabled efficient access to a service VM on the NAT agent's host. In some embodiments, the network address is an Internet protocol (IP) address. The terms "network address" and "IP address" are used interchangeably in this specification.

The replacement IP addresses do not necessarily belong to any logical network IP scheme and are not required to be public (or Internet routable) IP addresses, i.e., because the replacement IP addresses are only for use within the virtualized infrastructure and not for communicating outside of the virtualized infrastructure, they need not be publicly assigned IP addresses. The replacement IP addresses are used in some embodiments to identify distributed NAT traffic on hosts that are running cloud services. The replacement NAT IP addresses are re-used across multiple tenant networks in some embodiments. Each replacement IP address and port number pair is unique and is used to uniquely identify a specific tenant's VM for accessing a specific service VM.

The network address allocator 260 is a centralized controller that sends replacement IP address and port numbers to NAT agents to assign to tenants' VMs in different logical networks (i.e., logical networks of each tenant T1, T2, etc.). Although the replacement IP addresses are private, the network address allocator guarantees that the replacement IP address and port number pairs that are assigned to different VMs of different logical networks are unique. This is in contrast to the private IP address and port number of VMs that are assigned for use in their corresponding logical networks. Since the logical networks are assigned the private IP addresses independent of each other, there is no guarantee that two different logical networks do not assign the same IP address and port number to two different VMs.

The NAT agent in each host is located in the data path of the host's hypervisor. In some embodiments, the NAT agent is incorporated into the operation of the PFE. In some such embodiments, the NAT agent represents a set of flow entries that PFE uses when processing packets (e.g., when the PFE is Open VSwitch and provisioned via the the OpenFlow protocol). The NAT agent, in some embodiments, is a function that is called when packets are sent to the port on the hypervisor. As described further below, the NAT agent performs source NAT (SNAT) translation on packets that are sent from a tenant VM to a service VM.

In addition to replacement IP address and port number pairs, the network address allocator sends other parameters such as one or more of the VNI of the logical network of the tenant (that has enabled efficient access to a service), media access control (MAC) address of the service's VMs, host IP address of the service's VMs, and VNI of the logical network of the service to the NAT agents. In addition, as described further below, a set of rules for forwarding packets is sent from the network address allocator 260 to the NAT agents.

Figure 3:
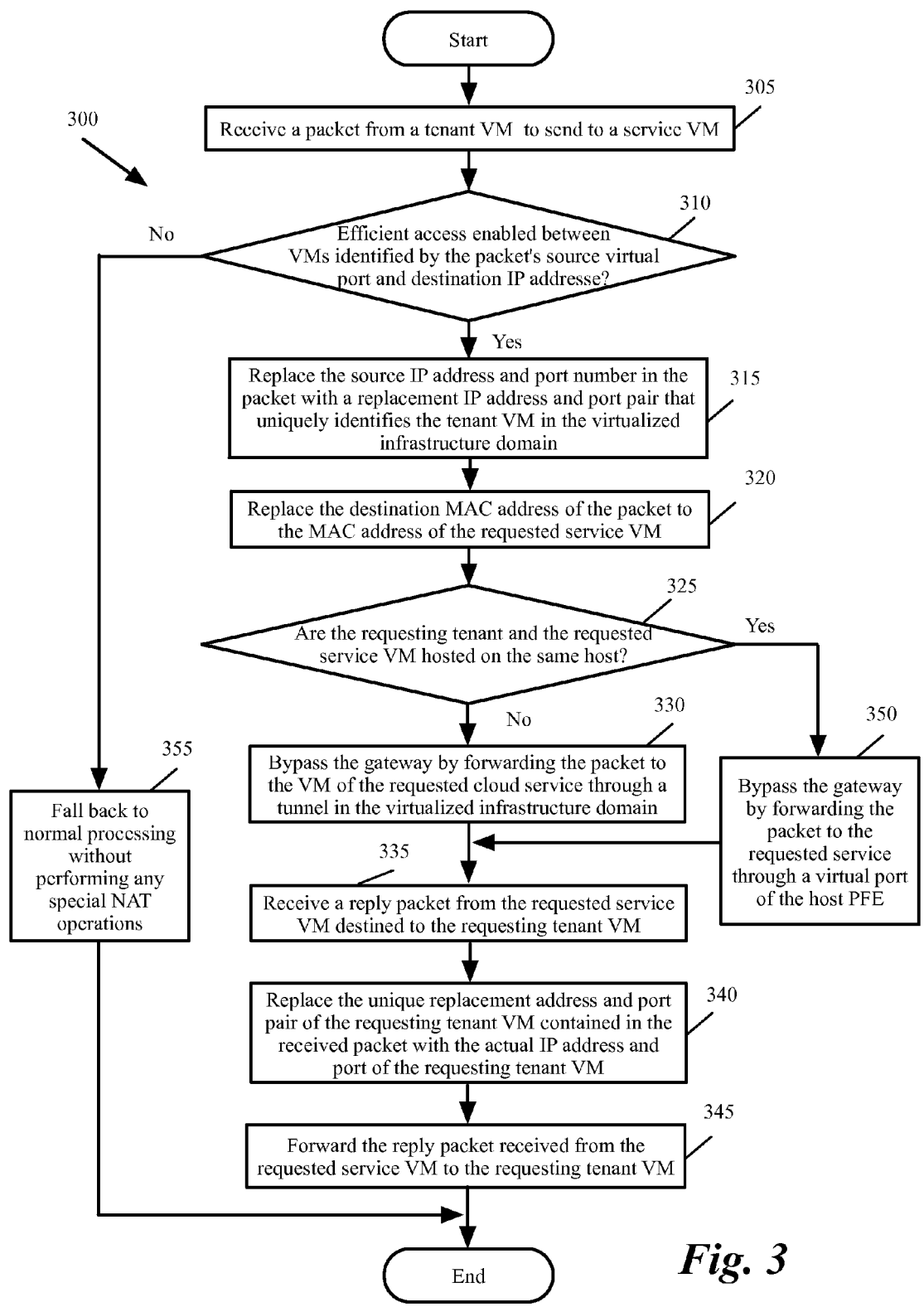
FIG. 3 conceptually illustrates a process for exchanging a packet between a tenant virtual machine and a cloud service virtual machine when efficient access is enabled between the tenant and the cloud service in some embodiments of the invention.

FIG. 3 conceptually illustrates a process 300 for exchanging a packet between a tenant VM and a cloud service VM when efficient access is enabled between the tenant and the cloud service in some embodiments of the invention. In some embodiments, process 300 is performed at the tenant VM host, with operations performed by the NAT agent, PFE, uplink, etc.

As shown, the process receives (at 305) a packet from a tenant VM to send to a service VM. The process then determines (at 310) whether efficient access is enabled between the VMs that are identified by the packet's source virtual port number and the destination IP address. As described further below, once a tenant enables efficient access to a service, some embodiments maintain a list of the tenant VM and service VM pairs that can exchange packets using efficient access. In these embodiments, process 300 searches the list to determine whether the source virtual port number and the destination IP address in the packet correspond to tenant and service VMs between which the efficient access is enabled. If yes, the process proceeds to 315, which is described below. Otherwise, the process falls back (at 355) to normal processing without performing any special NAT operations. Although the exemplary methods and systems in this specification are described based on whether or not a particular tenant has activated efficient access to a particular service, some embodiments enable efficient service for all tenants to all services hosted in a virtualized infrastructure domain without requiring an explicit request by a tenant.

When the process determines that efficient access between the tenant and the service is enabled, the process replaces (at 315) the source IP address and virtual port number in the packet with a replacement IP address and port number pair that uniquely identifies the tenant VM in the virtualized infrastructure domain when accessing a VM of the requested service. The process also replaces (at 320) the destination MAC address of the packet with the MAC address of the requested service VM. For instance, if the destination MAC address was set to the MAC address of the default gateway for the tenant VM (i.e., the NAT gateway), the process changes the destination MAC address to the MAC address of the requested service VM, which prevents the packet from being routed to the gateway.

The process then determines (at 325) whether the requesting tenant and the requested service VM are on the same host. If yes, the process bypasses (at 350) the gateway and forwards the packet to the requested service through a virtual port of the host physical forwarding element. The process then proceeds to 335, which is described below. Otherwise, when the two VMs are not on the same host, the process bypasses (at 330) the gateway by forwarding the packet to the VM of the requested cloud service through a tunnel in the virtualized infrastructure domain. A tunnel is a communication channel between two end points and is used to transport packets by encapsulation (e.g., to carry a payload over an incompatible delivery network and/or provide a secure path through an untrusted network).

At a later time, the process receives (at 335) a reply packet from the requested service VM destined to the requesting tenant VM. The process then replaces (at 340) the unique replacement address and port number pair of the requesting tenant VM contained in the received packet with the actual IP address and port number of the requesting tenant VM (i.e., the IP address and port number assigned for use in the logical network of the tenant VM). The process then forwards (at 345) the packet received from the requested service VM to the requested tenant VM. The process then ends. Process 300 is performed on each host. The network address translation is, therefore, distributed among different hosts. Details of the operations of process 300 are defined throughout this specification. Process 300 is a high level process. Different operations of the process (e.g., sending a packet from a tenant VM to a service VM and receiving a reply packet from the service VM) are performed by different modules in the tenant VM host at different times.

As described above, process 300 performs different NAT procedures for providing access to cloud services destination than for other destination. Specifically, operations 315-350 are performed when the destination is a cloud service, while operation 355 is performed when the destination address is not a cloud service.

As an example, the process receives a first packet from a particular VM of a particular tenant logical network, where the first packet specifies a destination address associated with a service VM. Based on the destination address of the first packet (which specifies a service VM), the process replaces the source IP address and source port number of the first packet with a replacement IP address and port number pair and forwards the packet to the destination (as described above by reference to 315-350).

The process then receives a second packet from a VM (the same particular VM or a different tenant VM), where the second packet specifies a destination address outside the particular tenant logical network but not associated with any service VM. The process, without modifying the source address and port number of the second packet, forwards the second packet to the default gateway of the tenant logical network (e.g., to forward to a network element outside the host for network address translation (NAT) processing, as described above by reference to 355). The system, therefore, performs different NAT operations on packets based on whether or not the packets are sent to a service destination.

I. Enabling of the Efficient Access

The network address allocator in some embodiments proactively provides pairs of replacement IP address and port number to NAT agents of any host machine that hosts a VM of a tenant that has enabled efficient access to a particular service. Each pair uniquely identifies the source (i.e., the requesting tenant VM) side of a connection between a VM of the tenant and a VM of the particular service. In some such embodiments, the network address allocator assigns enough pairs of replacement IP address and port number to uniquely identify the tenant's VMs on all possible connections between the tenant's VMs and the particular service's VMs even if the tenant's VMs have not started an active session to a VM of the particular service.

In other embodiments, the network address allocator reactively assigns a pair of IP address and port number when requested by a NAT agent. In these embodiments, the network address allocator only sends a replacement IP address and port number pair to a NAT agent when one of the tenant's VMs has started communication with one of the requested service's VMs.

A. Proactive Assignment of Replacement IP Address and Port Number Pairs

Figure 4:
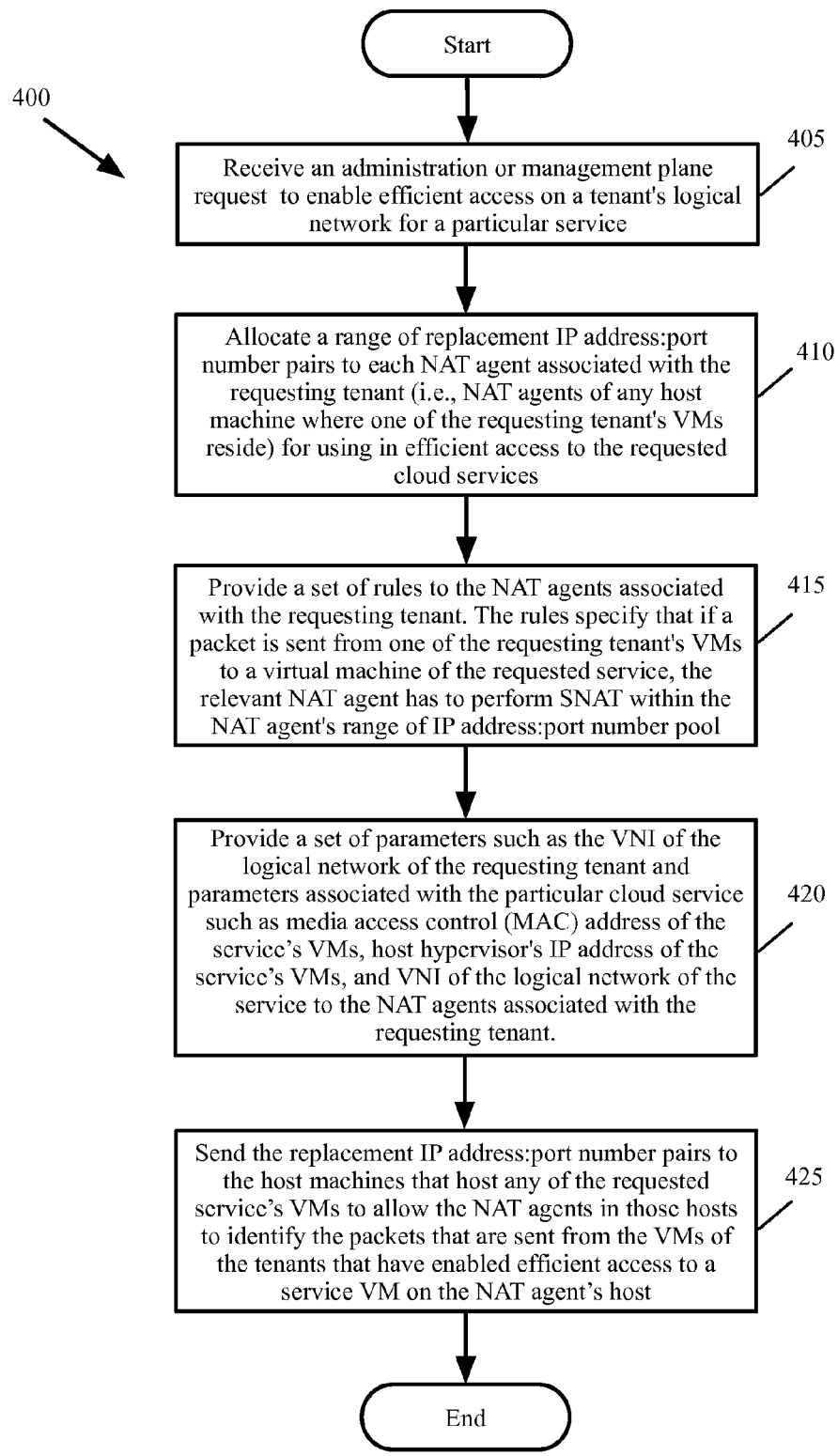
FIG. 4 conceptually illustrates a process for enabling efficient access in some embodiments of the invention.

FIG. 4 conceptually illustrates a process 400 for enabling efficient access in some embodiments of the invention. Process 400 is utilized by the network address allocator in some embodiments to proactively assign a range of replacement IP address:port number pairs to each NAT agent. As shown, the process receives (at 405) a request from an administration or management plane to enable efficient access on a tenant's logical network for a particular service. For instance, the request is received when a system administrator uses a set of administration and management tools to enable efficient access for a tenant to a particular cloud service. Enabling efficient access between a tenant and a service would cause packets exchanged between any VM of the tenant and any VM of the service to use the distributed NAT techniques as described in this specification.

Figure 5:
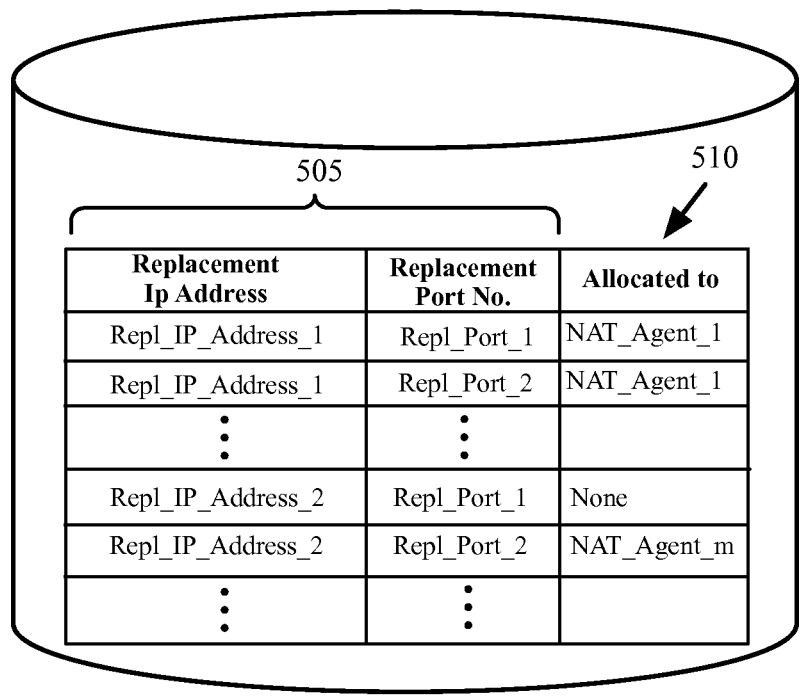
FIG. 5 conceptually illustrates a pool of replacement IP address and port number pairs maintained by the network address allocator in some embodiments of the invention.

Next, the process allocates (at 410) a range of replacement IP address:port number pairs to each NAT agent associated with the requesting tenant (i.e., the NAT agents of any host machine where one of the requesting tenant's VMs resides) for using in efficient access to the requested cloud services. FIG. 5 conceptually illustrates a pool of replacement IP address and port number pairs maintained by the network address allocator in some embodiments of the invention. As shown, the network address allocator maintains a set 505 of replacement IP addresses and port number pairs. The network address allocator in some embodiments also maintains the NAT agents (510) to which each IP address:port number pair is currently assigned. Each IP address:port number pair uniquely identifies the source (i.e., the requesting tenant VM) side of a connection between a tenant VM and a service VM in the virtualized infrastructure domain. A tenant VM might access multiple service VMs (of same or different service). Each connection between the tenant VM and a service VM uses a different unique pair of replacement IP address and port number to identify the tenant VM's side of the connection.

Referring back to FIG. 4, process 400 then provides (at 415) a set of rules to the NAT agents associated with the requesting tenant. The rules specify that if a packet is sent from one of the requesting tenant's VMs to a VM of the requested service, the relevant NAT agent has to perform SNAT within the NAT agent's range of IP address:port number pool. The process uses the destination IP address coming from a particular source port to match a rule.

The process then provides (at 420) a set of parameters such as the VNI of the logical network of the requesting tenant and parameters associated with the particular cloud service such as media access control (MAC) address of the service's VMs, host hypervisor's IP address of the service's VMs, and VNI of the logical network of the service to the NAT agents associated with the requesting tenant.

Figure 6:
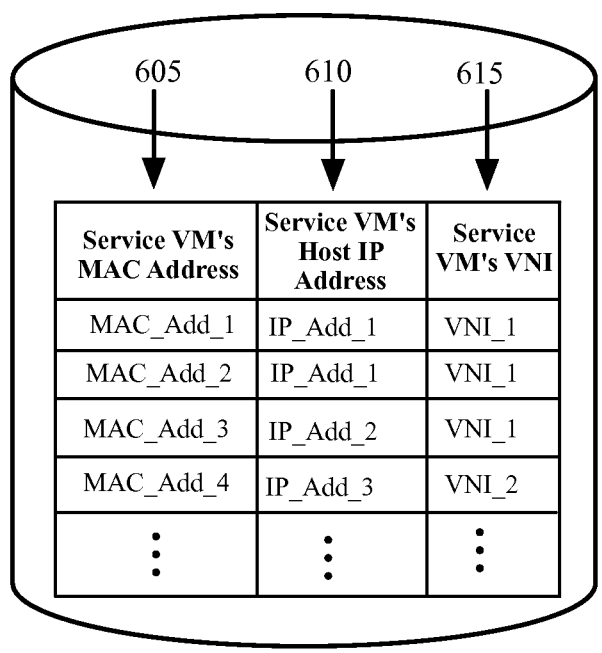
FIG. 6 conceptually illustrates a set of parameters associated with different cloud services that is maintained by the network address allocator and provided to the NAT agents in some embodiments of the invention.

FIG. 6 conceptually illustrates a set of parameters associated with different cloud services that is maintained by the network address allocator and provided to the NAT agents of the requesting tenants in some embodiments of the invention. As shown, the network address allocator maintains a list of each service VM's MAC address 605, host IP address 610, and virtual network identifier (VNI) 615. For particular cloud service, the VNI will be the same.

Referring back to FIG. 4, process 400 then sends (at 425) the replacement IP address:port number pairs to the host machines that host any of the requested service's VMs (even when those hosts do not host any of the requesting tenant's VMs) to allow the NAT agents in the hosts to identify the packets that are sent from the VMs of the tenants that have enabled efficient access to a service VM on the NAT agent's host. The process then ends.

Figure 7:
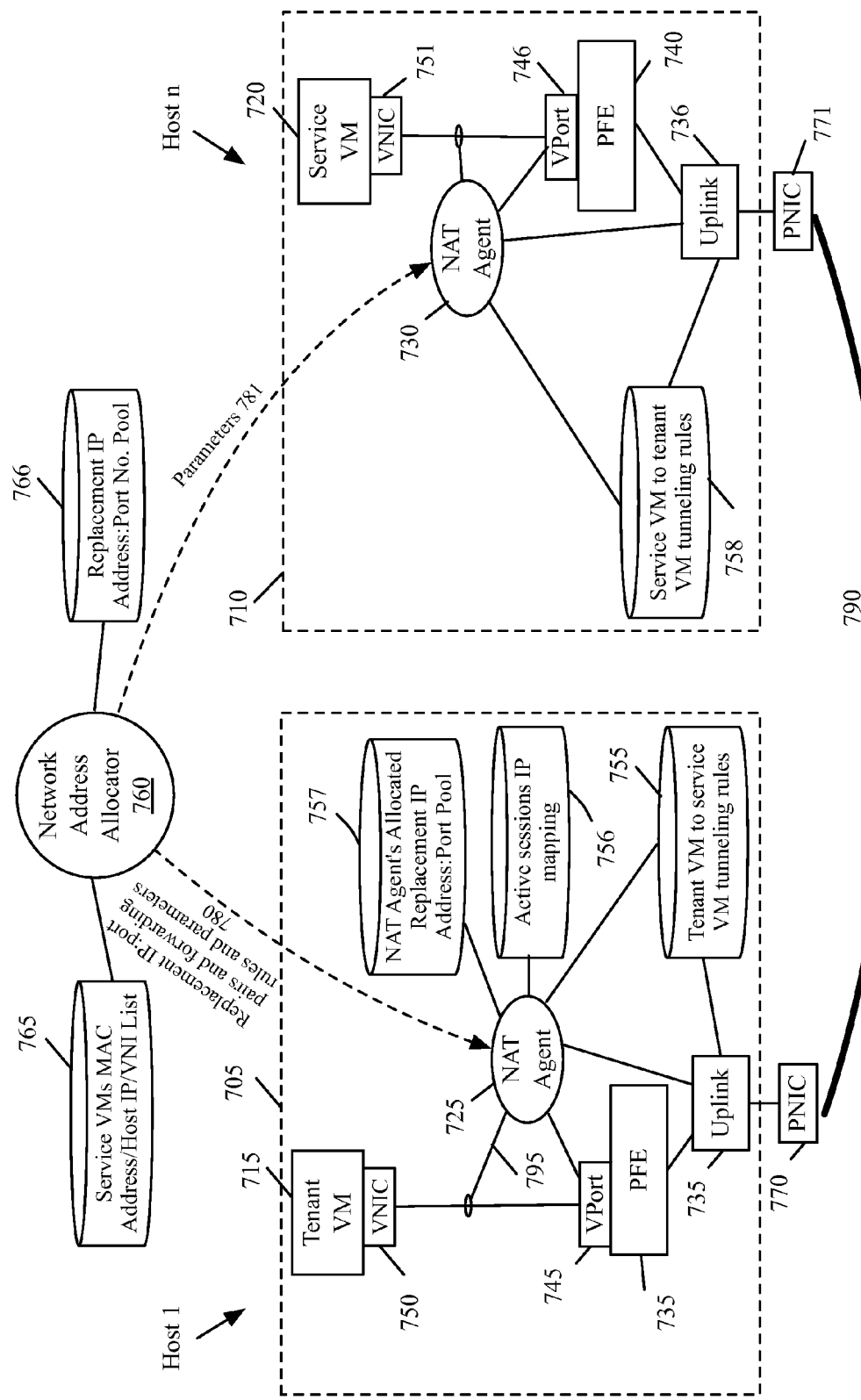
FIG. 7 conceptually illustrates an example of a tenant VM and a service VM on different hosts that exchange packets through a direct tunnel between the hosts in some embodiments of the invention.

FIG. 7 conceptually illustrates an example of a tenant VM and a service VM on different hosts that exchange packets through a direct tunnel between the hosts in some embodiments of the invention. The figure shows two hosts 705 and 710. Each host can include multiple tenant and/or service VMs. Only one tenant VM 715 on host 705 and one service VM 720 on host 710 are shown for simplicity.

Each host 705-710 includes a NAT agent 725-730, respectively. Each host 705 and 710 also includes a physical forwarding element (PFE) 735 and 740, respectively. In the virtualization field, some refer to software switches as virtual switches as these are software elements. However, in this specification, the software forwarding elements are referred to as physical forwarding elements (PFEs), in order to distinguish them from logical forwarding elements (LFEs), which are logical constructs that are not tied to the physical world. In other words, the software forwarding elements are referred to as PFEs because they exist and operate in the physical world, whereas LFEs are simply a logical representation of a forwarding element that is presented to a user when designing a logical network. In some embodiments, several PFEs are distributed throughout the network implement tenant's LFEs.

Each PFE 735 and 740 connects to a physical network interface card (PNIC) 770 and 771 respectively to send outgoing packets and to receive incoming packets. In some embodiments, a PFE is defined to include a port (not shown) through which it connects to the PNIC to send and receive packets. Each PFE is also defined to have several virtual ports (VPorts) to connect to tenant VMs, only one of these VPorts is shown on each PFE for simplicity. As shown, tenant VM 715 is connected to VPort 745 of PFE 735 through a virtual network interface card (VNIC) 750. Similarly, service VM 720 is connected to VPort 746 of PFE 740 through a VNIC 751. In some embodiments, each VNIC in a VM is responsible for exchanging packets between the VM and the network virtualization layer through an associated VNIC emulator. Each VNIC emulator interacts with NIC drivers in the VMs to send and receive data to and from the VMs. In some embodiments, the VNICs are software abstractions of physical NICs implemented by virtual NIC emulators. For instance, the code for requesting and obtaining a connection ID resides in components of virtual NIC emulators in some embodiments. In other words, the VNIC state is implemented and maintained by each VNIC emulator in some embodiments. Virtual devices such as VNICs are software abstractions that are convenient to discuss as though part of VMs, but are actually implemented by virtualization software using emulators. The state of each VM, however, includes the state of its virtual devices, which is controlled and maintained by the underlying virtualization software.

NAT agent 725 monitors (as conceptually shown by the line 795) the packets that are sent to or from VMs on host 705 including tenant VM 715. Similarly, NAT agent 730 monitors the packets that are sent to or from VMs on host 710 including service VM 720. A NAT agent in some embodiments is an extension of the functionality of the PFE that monitors the traffic at the VPort and interacts with the uplink. In other embodiments, NAT agent is a separate entity that interacts with the PFE, virtual ports, and uplink. An uplink 735 (or 736) is a module that relays packets between the PFE 735 (or 740) and the PNIC 770 (or 771) in order to perform various packet processing functions on incoming and outgoing traffic.

As shown, a tunnel 790 is established for packets sent from tenant VM 705 to service VM 720. Also shown is the network allocator 760 that maintains the pool 766 of replacement IP address and port numbers (e.g., as described by reference to FIG. 5 above). The network address allocator 760 also maintains a list 765 of different parameters of service VMs (e.g., as described by reference to FIG. 6 above).

When efficient access is enabled between a requesting tenant and a requested service, the network address allocator 760 sends a set of replacement IP address:port number pairs as well as a set of parameters and rules 780 to NAT agents of any hosts that hosts at least one of the requesting tenant's VMs. In addition, the network address allocator 760 in some embodiments sends the replacement IP address:port number pairs 781 to NAT agents of any hosts that hosts at least one of the requested service's VMs (even if there are no VMs of the requesting tenant on a host). In the example of FIG. 7, it is assumed that none of the requesting tenant's VMs are on host 710. Since host 710 has one of the requested service's VMs 720, the NAT agent 730 of host 710 has received the replacement IP address:port number pairs 781 that are defined for assignment to the VMs of the tenants that have enabled efficient access to a service (in this example the service is provided by service VM 720) on the NAT agent's host 710. This allows the NAT agent 730 to identify the packets that are sent from the VMs (such as VM 715) of the tenants that have enabled efficient access to a service VM on the NAT agent's host.

Figure 8:
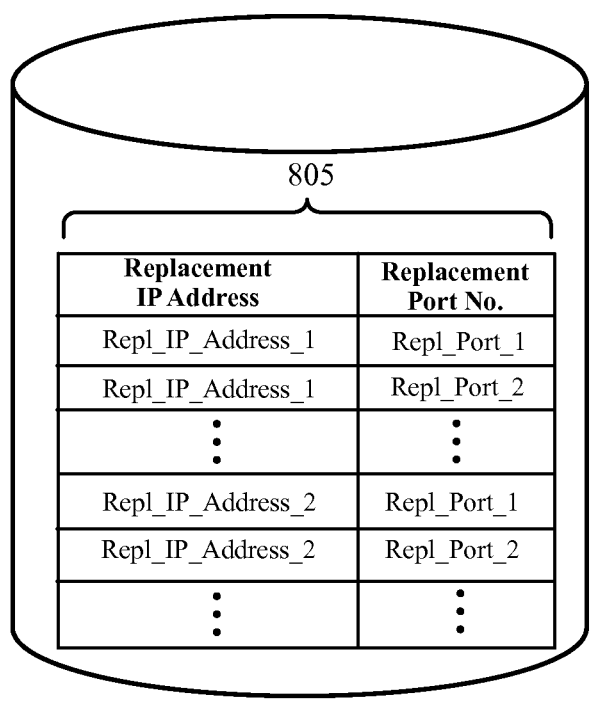
FIG. 8 conceptually illustrates a list of the allocated replacement IP address:port number pairs that a NAT agent on the host of a VM of a service (for which efficient access is enabled) receives from the network address allocator.

FIG. 8 conceptually illustrates a list of the allocated replacement IP address:port number pairs that a NAT agent on the host of a VM of a service (for which efficient access is enabled) receives from the network address allocator. The NAT agent stores the list in order to identify the tenant VMs for which the efficient access is enabled.

As shown, the NAT agent stores the list of the allocated replacement IP address and port number pairs 805. The NAT agent receives updates as replacement IP address:port number pairs are assigned and reclaimed. In some embodiments, each NAT agent is assigned a minimum number of replacement IP addresses thus the NAT agent will only receive more than one replacement IP address if all of the ports for that replacement IP address are used.

As shown in FIG. 7, the NAT agent maintains different databases (or tables) such as a pool 757 of replacement IP address:port number pairs, a list 756 of active sessions IP mapping, a set 755 of tenant VM to service VM tunneling rules, and tunneling rules 758 for sending reply packets from the service VM 720 to the requesting tenant VM 715 through the same tunnel 790. The details of the generation and use of these databases are described further below.

Figure 9:
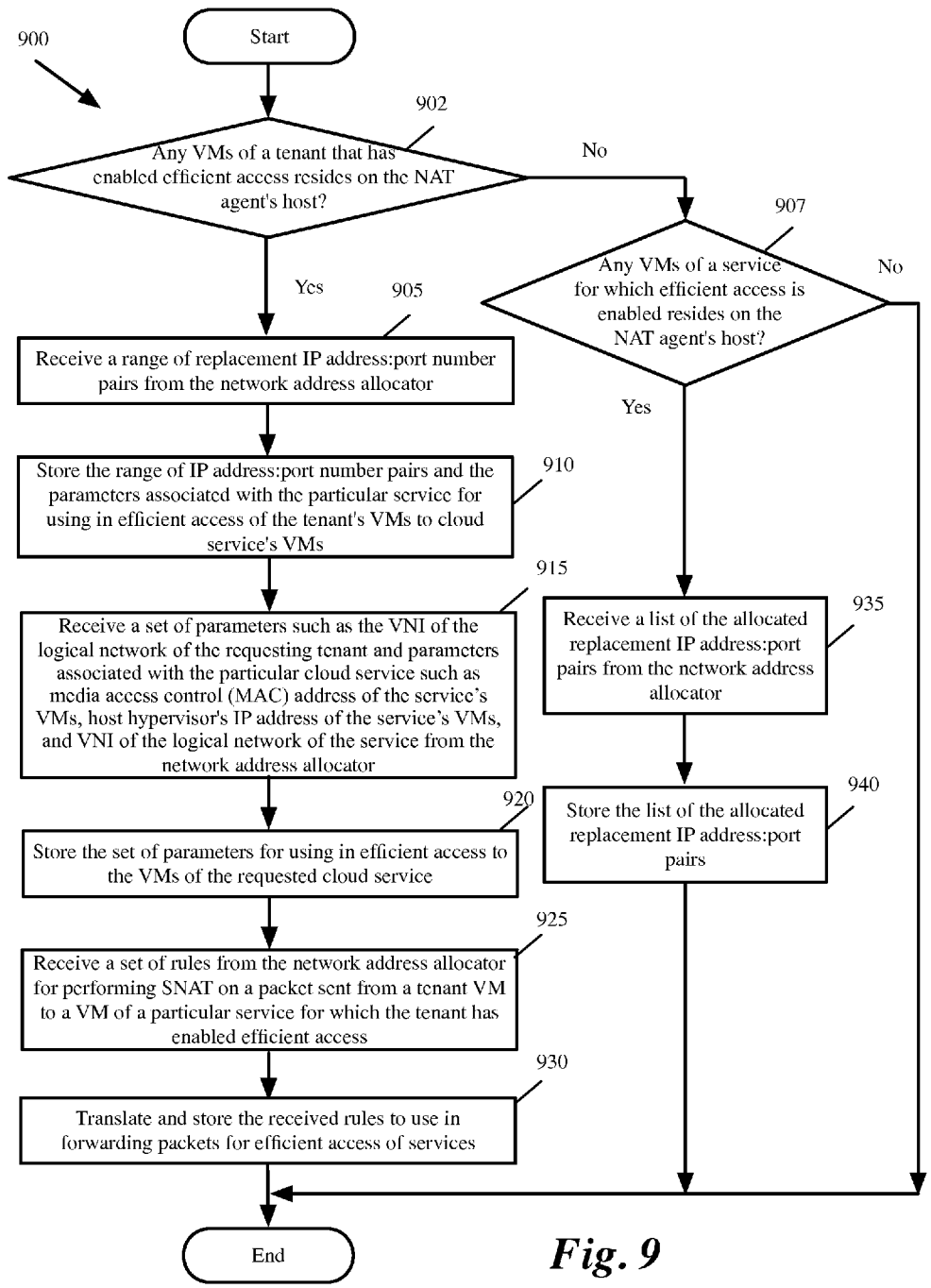
FIG. 9 conceptually illustrates a process for a NAT agent's interactions with the network address allocator in some embodiments of the invention.

FIG. 9 conceptually illustrates a process 900 for a NAT agent's interactions with the network address allocator in some embodiments of the invention. Process 900 in some embodiments is used to interact with a proactive network address allocator described by reference to FIG. 4 above. As shown in FIG. 9, the process determines (at 902) whether any VMs of a tenant that has enabled efficient access resides on the NAT agent's host. If yes, the process proceeds to 905, which is described below. For instance, in FIG. 2, T1-1 resides on host 201 and is a VM of tenant T1 that has enabled efficient access to service S1. On the other hand, there are no VMs of tenant T1 on host 203.

When the process determines that there are no VMs of the requesting tenant on the NAT agent's host, the process determines (at 907) whether any VMs of a service for which efficient access is enabled resides on the NAT agent's host. For instance, in the example of FIG. 7, host 710 includes a VM 720 of a service for which efficient access is enabled. Operation 902 and 907 are conceptual operations and are not actually performed by a NAT agent (e.g., when a VM of a tenant that has enabled efficient access resides on a host, the NAT agent on that host performs operations 905-930 and when a VM of a service for which efficient access is enabled resides on a host, the NAT agent on that host performs operations 935-940).

If not, the process exits as there are no VMs for any tenant or service that require efficient access. Otherwise, the process receives (at 935) a list of the allocated replacement IP address:port number pairs from the network address allocator. The process then stores (at 940) the list of the allocated replacement IP address:port number pairs (e.g., as described by reference to FIG. 8 above). The process then ends.

Figure 10:
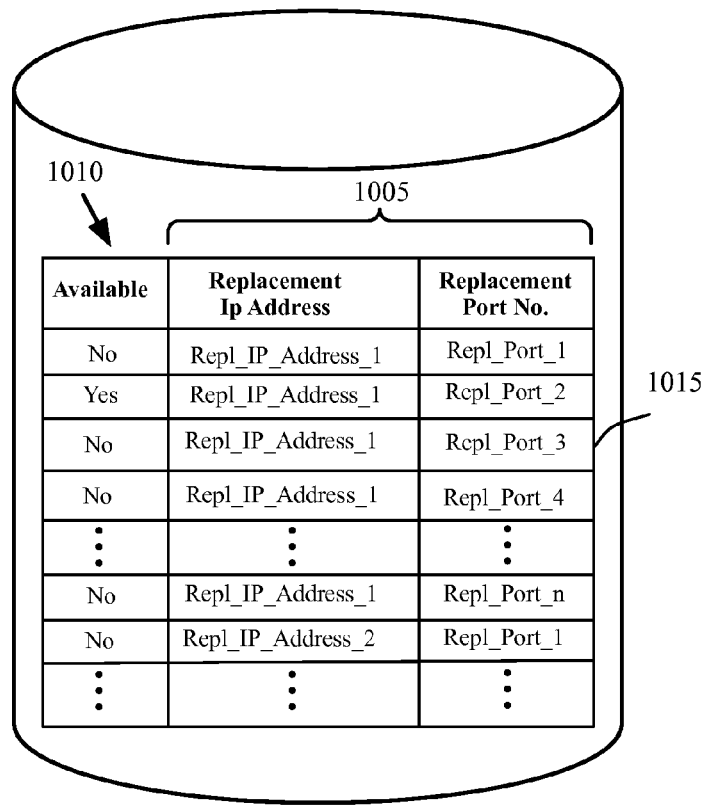
FIG. 10 conceptually illustrates a set of replacement IP address and port number pairs that a NAT agent has received from the network address allocator in some embodiments of the invention.

The process receives (at 905) a range of IP address:port number pairs from the network address allocator. The NAT agent stores (at 910) the replacement IP address:port number pairs for using in efficient access of tenants VM to cloud services. FIG. 10 conceptually illustrates a set of replacement IP address and port number pairs that a NAT agent has received from the network address allocator in some embodiments of the invention. As shown, the NAT agent stores pairs 1005 of replacement IP and port numbers received from the network address allocator in a "allocated replacement IP address:port number pair" pool 1015. As described further below, the NAT agent utilizes the pairs to uniquely identify tenants VMs for accessing cloud services VMs. As shown in FIG. 10, a field 1010 specifies whether each pair is currently assigned to a tenant VM or is available for assignment.

Referring back to FIG. 9, the process then receives (at 915) a set of parameters such as the VNI of the logical network of the tenant that has enabled efficient access to a particular cloud service and parameters associated with the particular cloud service such as media access control (MAC) address of the service's VMs, host hypervisor's IP address of the service's VMs, and VNI of the logical network of the service from the network address allocator. The process then stores (at 920) the received parameters for using in efficient access to the VMs of the requested cloud service. In some embodiments, if the parameters have previously been send from the network address allocator to a NAT agent, the parameters are not sent again unless the parameters are changed.

Figure 11:
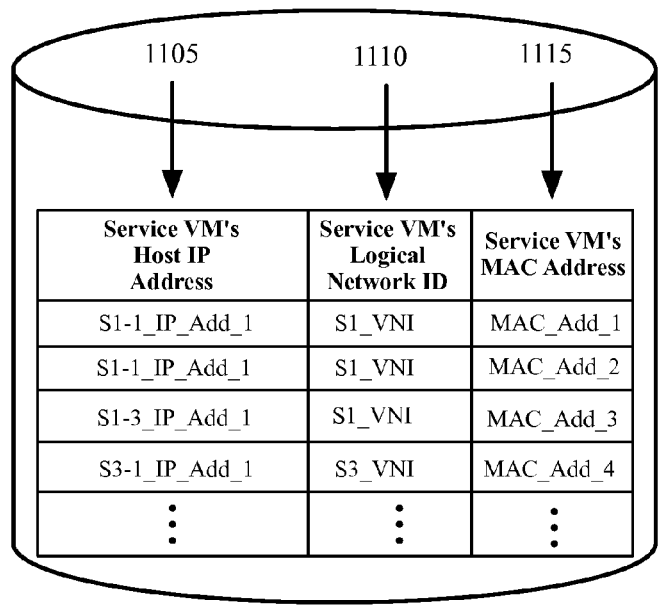
FIG. 11 conceptually illustrates a set of parameters associated with different cloud services that a NAT agent has received from the network allocator and has stored for using in efficient access to the cloud services.

FIG. 11 conceptually illustrates a set of parameters associated with different cloud services that a NAT agent has received from the network allocator and has stored for using in efficient access to the cloud services. For each VM of the requested service, the NAT agent receives and stores the host IP address 1105 of the VM, the service VM's VNI 1110 (which is the same for all VMs of the same cloud service), and the service VM's MAC address 1115. As described further below, these parameters are utilized to identify tunnels used to exchange packets between tenant VMs and service VMs.

Referring back to FIG. 9, the process receives (at 925) a set of rules from the network address allocator for performing SNAT on a packet sent from a tenant VM to a VM of a particular service for which the tenant has enabled efficient access. The process then translates (at 930) and stores the received rules to use in forwarding packets for efficient access of the services. The process then ends.

Figure 12:
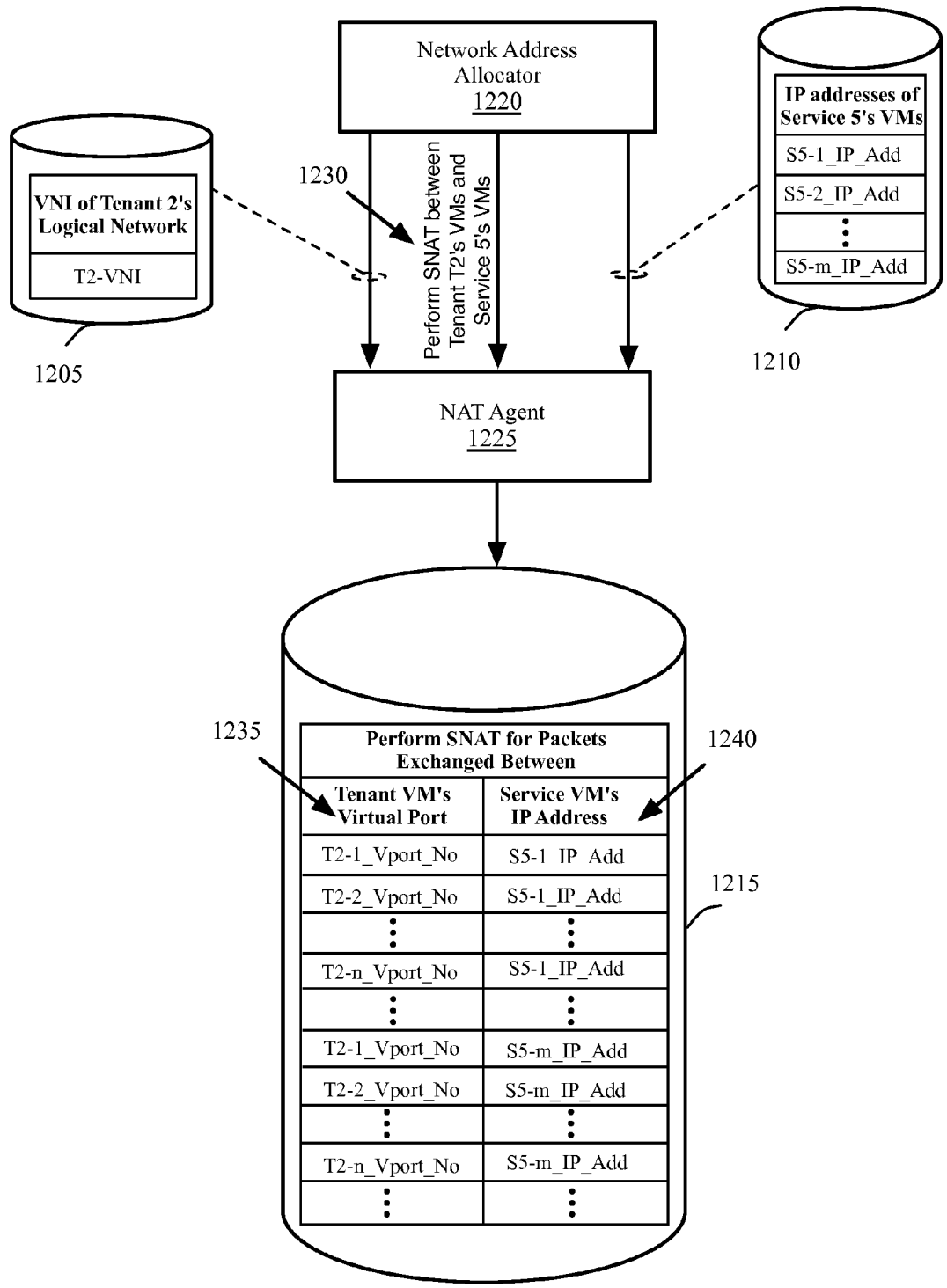
FIG. 12 conceptually illustrates a set of translated rules that a NAT agent stores in some embodiments of the invention.

FIG. 12 conceptually illustrates a set of translated rules that a NAT agent stores in some embodiments of the invention. As shown, the NAT agent 1225 receives a set of rules 1230 and the associated parameters 1205-1210 from the network allocator 1220 and translates and stores them for forwarding packets from a tenant's VMs to a service's VMs.

In this example, the set of rules includes the rule 1230 to "perform SNAT between tenant T2's VMs and Service 5's VMs". This rule is sent from the network address allocator to NAT agents of any host that hosts one of tenant 2's VMs when the network address allocator receives (e.g., through the administrator or management plane) a request to enable efficient access for VM's of tenant 2 to services of service 5. The parameters sent from the network address allocator 1220 to the NAT agent 1225 include the VNI 1205 of tenant 2's logical network and the IP addresses 1210 of service 5's VMs.

As shown, the NAT agent 1225 has translated and stored a list of forwarding rules 1215. The list includes pairs of tenant VMs' virtual port number and service VM's IP address that require performing SNAT. For instance, the rules 1215 specify that for packets sent from any of tenant 2's VMs (in this example T2-1 to T2-*n*) to any of service 5's VMs (in this example S5-1 to S5-*m*) SNAT is required. Similarly, the rules 1215 specify that for packets sent from any of service 5's VMs to any of tenant 2's VMs a reverse SNAT is required. The NAT agent uses the VNI 1205 of the tenant's logical network to identify the virtual port numbers 1235 of the tenant's VMs that are hosted on the NAT agent's host.

The pair of tenant VM's virtual port number 1235 and service VM's IP address 1240 is used by the NAT agent 1225 to determine whether a packet exchanged between a tenant VM and a service VM requires SNAT. The virtual port numbers 1235 and the IP addresses 1210 and 1240 are the actual virtual port numbers and IP addresses of the corresponding VM (i.e., the virtual port number and the IP address that is assigned for use in the VM's logical network) and not the replacement port numbers and replacement IP addresses that are assigned to the tenants VMs for preforming efficient access.

In some embodiments, each NAT agent in the example of FIG. 12 of a host that hosts either one of tenant 2's VMs receives the same set of rules 1230 and the same set of parameters 1205-1210 and performs the rule translation. In some of these embodiments, each NAT agent is aware of the tenant VMs that are hosted on the same host machine that the NAT agent resides and deletes (or does not translate) rules that correspond to tenant VMs on other hosts. In other embodiments, the network address allocator only sends the parameters of the tenant VMs that reside on a host to the NAT agent of the corresponding host.

B. Reactive Assignment of Replacement IP Address and Port Number Pairs

Figure 13:
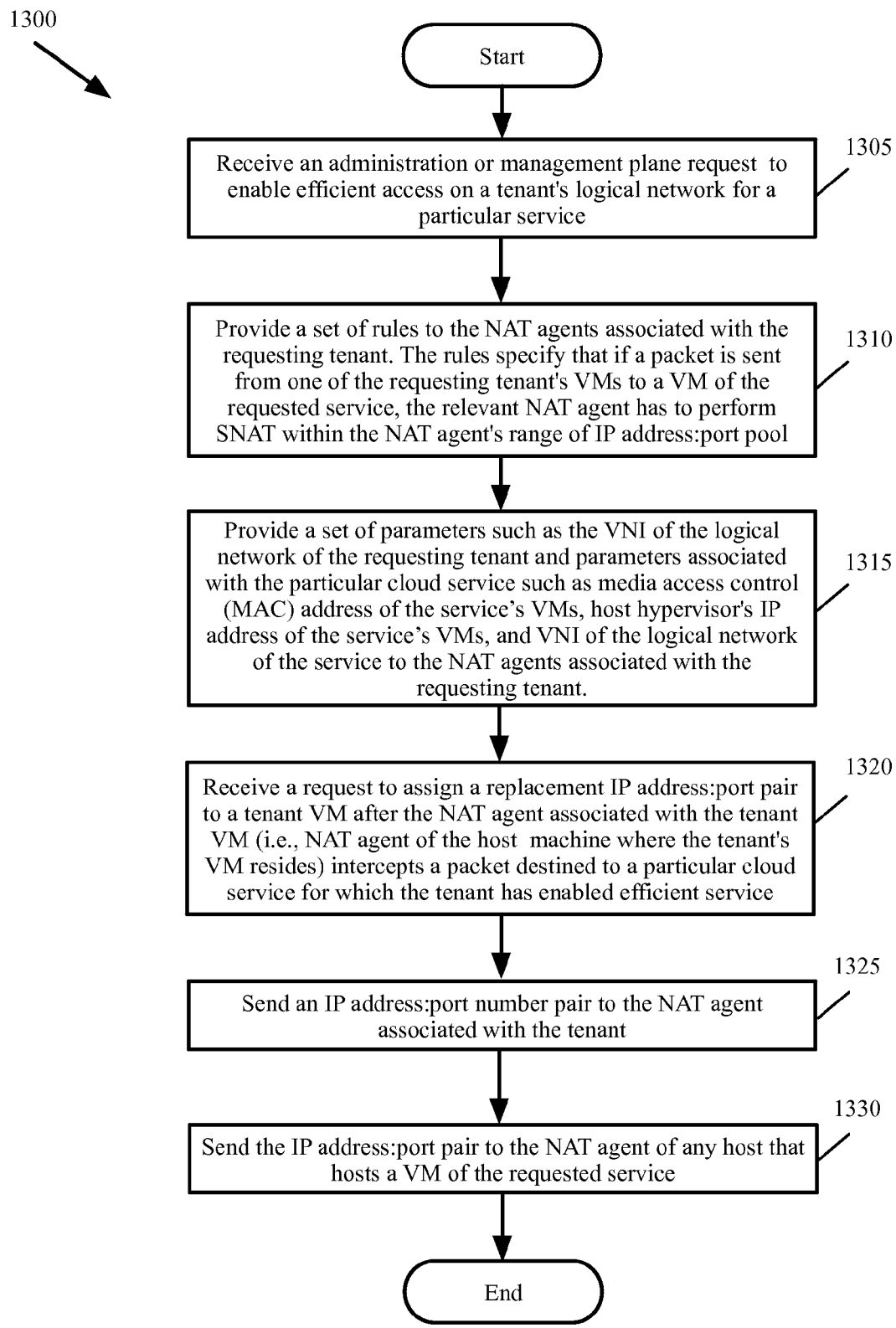
FIG. 13 conceptually illustrates a process for enabling efficient access in some embodiments of the invention.

FIG. 13 conceptually illustrates a process 1300 for enabling efficient access in some embodiments of the invention. Process 1300 is utilized by the network address allocator in some embodiments to reactively assign replacement IP address:port number pairs to NAT agents. As shown, the process receives (at 1305) a request from an administration or management plane to enable efficient access on a tenant's logical network for a particular service. For instance, the request is received from a system administrator through a set of administration and management tools.

The process provides (at 1310) a set of rules to the NAT agents associated with the requesting tenant. The rules specify that if a packet is sent from one of the requesting tenant's VMs to a VM of the requested service, the relevant NAT agent has to perform SNAT within the NAT agent's range of IP address:port number pool. The process uses the destination IP address coming from a particular port to match a rule.

The process then provides (at 1315) a set of parameters such as the VNI of the logical network of the requesting tenant and parameters associated with the particular cloud service such as media access control (MAC) address of the service's VMs, host hypervisor's IP address of the service's VMs, and VNI of the logical network of the service to the NAT agents associated with the requesting tenant.

The process then receives (at 1320) a request to assign a replacement IP address:port number pair to a tenant VM after the NAT agent associated with the tenant VM (i.e., NAT agent of the host machine where the tenant's VM resides) intercepts a packet destined to a particular cloud service for which the tenant has enabled efficient service.

The NAT agent in some embodiments is either an extension of the functionality of the PFE or an entity external to the PFE that monitors the PFE's traffic (e.g., at the VPort connecting the tenant VM to the PFE). In some of these embodiments, interception of the packets by the NAT agent is done by the NAT agent examining the packet traffic that are sent from the tenant's VM to the PFE. In other embodiments, the packets are passed to the NAT agent when a certain condition is satisfied (e.g., the source and destination addresses of a packet match the source and destination addresses of a particular tenant's VM and a particular service's VM where the particular tenant has enabled efficient service to the particular service. The preceding description applies to the interception of packets by the NAT agent throughout this specification.

The process then sends (at 1325) a replacement IP address:port number pair to the NAT agent associated with the requesting tenant for using in efficient access to the requested services. The process then sends (at 1330) the replacement IP address:port number pair to the NAT agent of any host that hosts a VM of the requested service. The process then ends.

Figure 14:
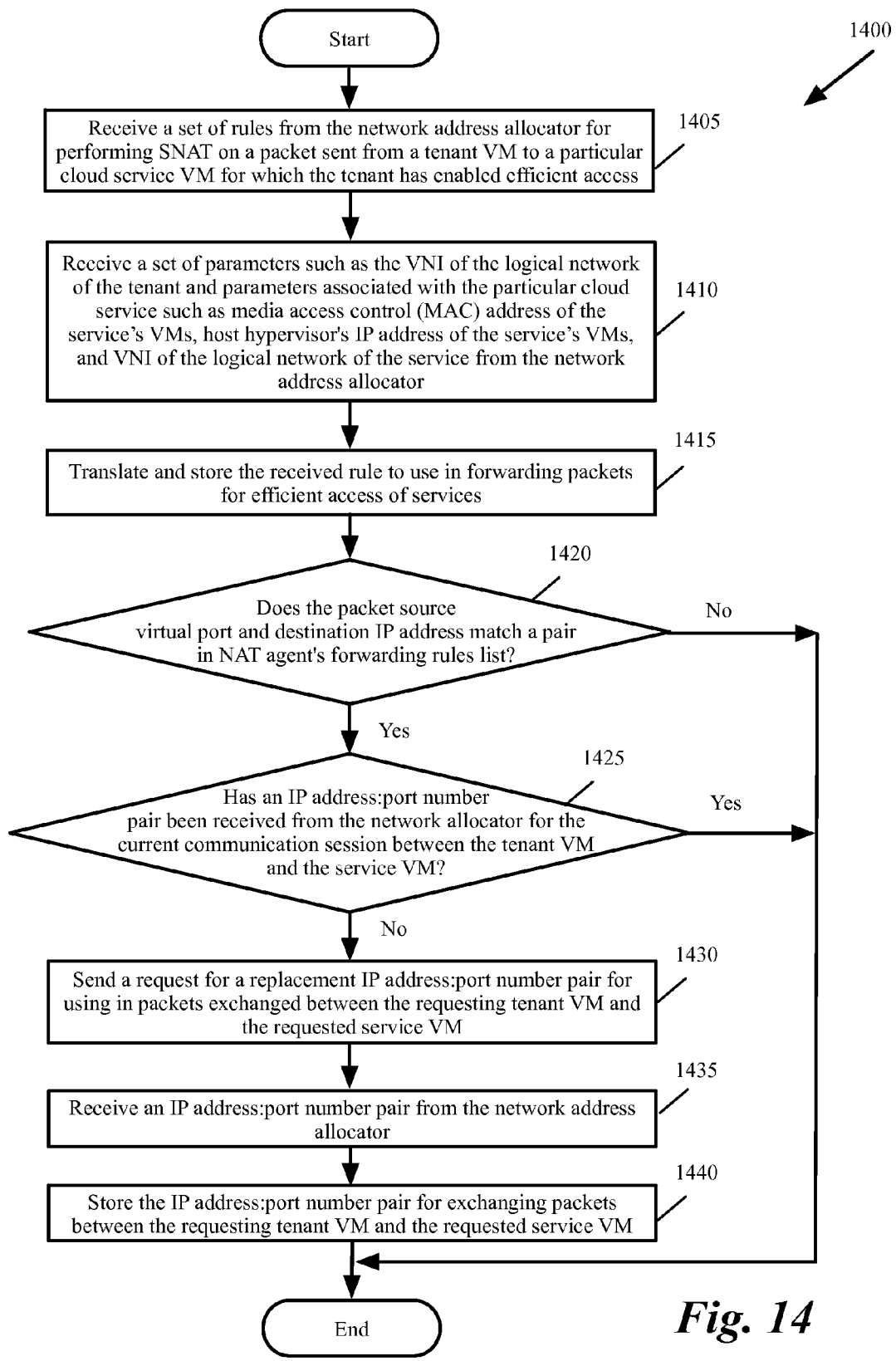
FIG. 14 conceptually illustrates a process for a NAT agent's interactions with the network address allocator in some embodiments of the invention.

FIG. 14 conceptually illustrates a process 1400 for a NAT agent's interactions with the network address allocator in some embodiments of the invention. Process 1400 in some embodiments is used to interact with a reactive network address allocator described by reference to FIG. 13 above.

As shown in FIG. 14, the process receives (at 1405) a set of rules from the network address allocator for performing SNAT on a packet sent from a tenant VM to a VM of a particular service for which the tenant has enabled efficient access.

The process then receives (at 1410) a set of parameters such as the VNI of the logical network of the tenant and parameters associated with the particular cloud service such as media access control (MAC) address of the service's VMs, host hypervisor's IP address of the service's VMs, and VNI of the logical network of the service from the network address allocator. The process then translates (at 1415) and stores the received rules to use in forwarding packets for efficient access of the services.

The process then determines (at 1420) whether the source virtual port number and destination IP address in the packet match a pair of source virtual port number and destination IP addresses in NAT agent's forwarding rule list (e.g., the list 1215 described above by reference to FIG. 12). If not, the process exits. Otherwise, the process determines (at 1425) whether a pair of replacement IP address and port number has been received from the network allocator for the current communication session between the requesting tenant VM and the requested service VM. As described further below, pairs of replacement IP address and port number expire and are reclaimed either explicitly or after a predetermined timeout. Therefore, the process ensures that any pair of replacement IP address and port number pair allocated for communication between the tenant and service VMs is still valid and not expired. If a replacement pair of IP address: port number exists, the process exits.

Otherwise, the process sends (at 1430) a request for a replacement IP address:port number pair for using in packets exchanged between the requesting tenant VM and the requested service VM. The process then receives (at 1435) an IP address:port number pair from the network address allocator. The process then stores (at 1440) the replacement IP address:port number pair for exchanging packets between the requesting tenant VM and the requested service VM. The process then ends. In some embodiments, a single IP address:port number pair is only used by a single NAT session. For instance, when the tenant VM, T1-1 communicates to service VMs S1-1 and S1-2, different pairs of replacement IP address:port number pairs has to be used to identify T1-1 since the communication between T1-1 and as S1-1 and between T1-1 and S1-2 are through different NAT sessions.

II. Sending a Packet from a Tenant Virtual Machine to a Service Virtual Machine

Figure 15:
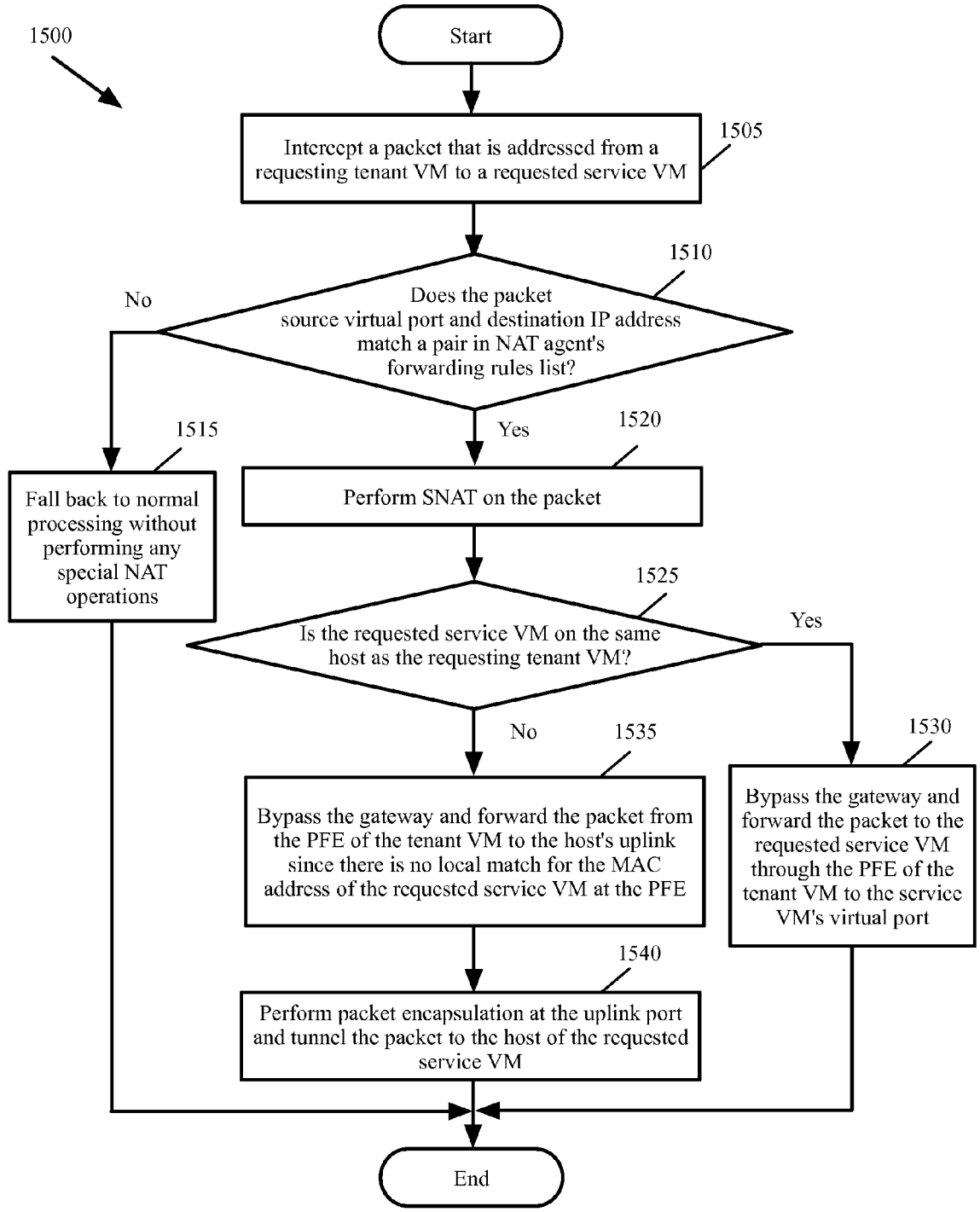
FIG. 15 conceptually illustrates a process for handling of outgoing packets in some embodiments of the invention.

FIG. 15 conceptually illustrates a process 1500 for handling of outgoing packets in some embodiments of the invention. As shown, the process intercepts (at 1505) a packet that is addressed from a requesting tenant VM to a requested service VM.

The process then determines (at 1510) whether the virtual port number of the source VM and the IP address of the destination VM match a pair of source virtual port number and destination IP address in the list of NAT agent's forwarding rules (e.g., a pair identified in the rules 1215 described by reference to FIG. 12 above). If yes, the process proceeds to 1520, which is described below. Otherwise, the process falls back (at 1515) to normal processing without any special NAT operations (i.e., the process performs prior art operations to forward the packet and receive reply packets without performing the SNAT operations disclosed herein). In this case, if the packet is sent outside the tenant logical network but not to a service VM, then traditional NAT using public IP address by a NAT gateway may be performed.

In some embodiments, the NAT agent intercepts packets that go through the virtual port of the tenant VM. In these embodiments, the NAT agent performs operations 1505-1515. In other embodiments, a packet is passed to the NAT agent only when condition 1510 is true. In these embodiments, the NAT agent does not perform operations 1505-1515.

The process performs (at 1520) SNAT on the packets. Details of performing SNAT are further described by reference to FIG. 16 below. The process then determines (at 1525) whether the requested service VM is on the same host as the requesting tenant. For instance, the process in some embodiments compares the MAC address indicated in the packet for the destination VM with a list of MAC addresses of the service VM that are on the same host. When the destination MAC address does not match the MAC address of any service VM on the same host, the process determines that the service VM is on a different host. If the two VMs are on different hosts, the process proceeds to 1535, which is described below. Otherwise, the process bypasses the gateway and forwards (at 1530) the packet to the requested service VM through the PFE of the tenant VM to the virtual port of the service VM. The process then ends. In some embodiments, 1530 is performed when both the requesting tenant VM and the requested service VM are on the same PFE. In some embodiments, when the requesting tenant VM and the requested service VM are on the same host but not on the same PFE, the packet is sent through a tunnel.

When the tenant VM and the service VM are not on the same host (or the requesting tenant VM and the requested service VM are on the same host but not on the same PFE), the process bypasses the gateway and forwards (at 1535) the packet from the PFE of the tenant VM to the host's uplink (since there is no local match for the MAC address of the requested service VM at the PFE). The process then performs (at 1540) packet encapsulation at the uplink port and tunnels the packets to the host of the requested service VM. Tunnels in some embodiments are setup by the host's network stack, and the IP connectivity is provided using, e.g., generic routing encapsulation (GRE), network virtualization using GRE (NVGRE), virtual extensible local area network (VxLAN), or stateless transport tunneling (STT).

Figure 16:
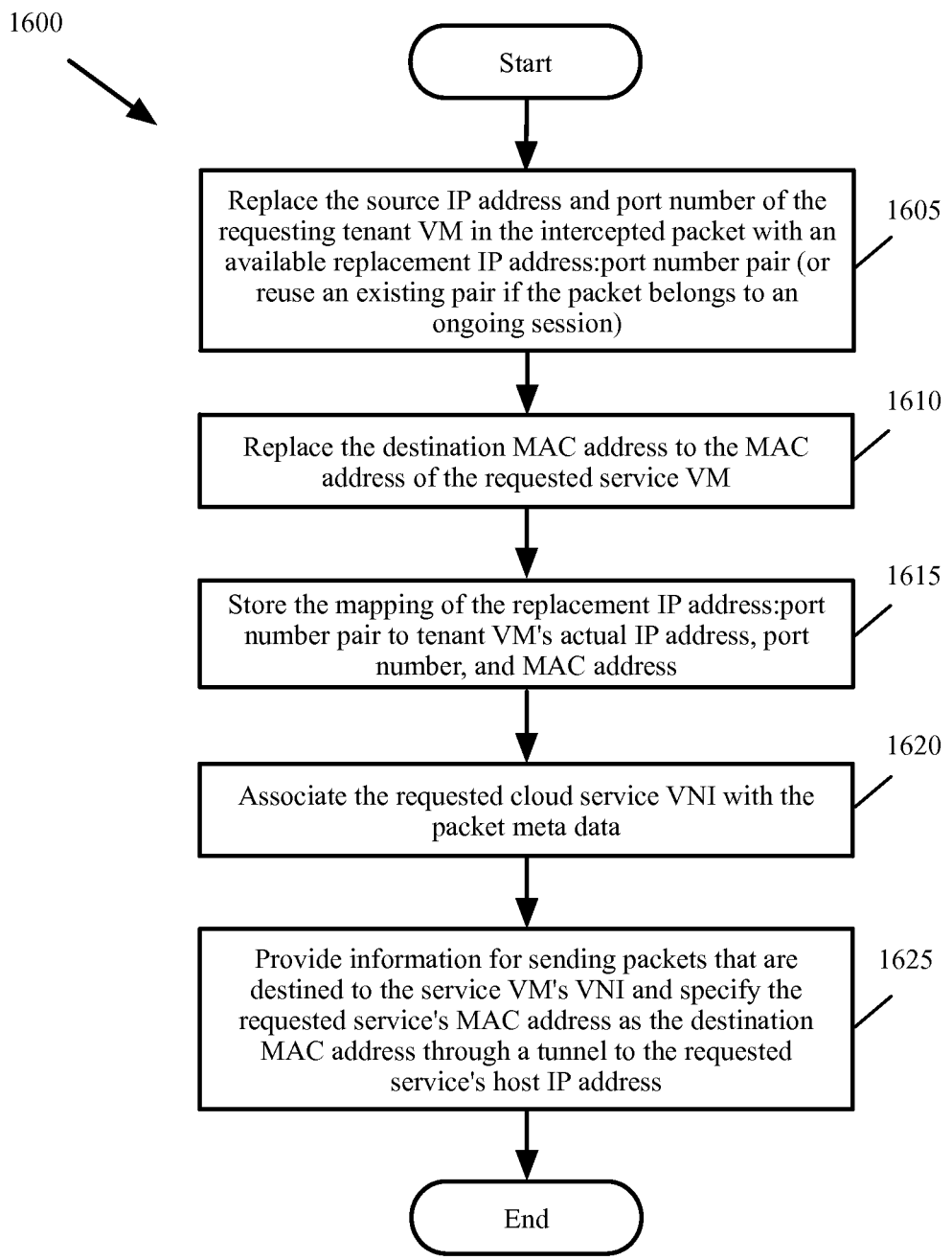
FIG. 16 conceptually illustrates a process for performing SNAT in some embodiments of the invention.

FIG. 16 conceptually illustrates a process 1600 for performing SNAT in some embodiments of the invention. In some embodiments process 1600 is performed by the NAT agent on the tenant VM's host. As shown, the process replaces (at 1605) the source IP address and port number of the requesting tenant's VM in the packet with an available replacement IP address:port number pair (or reuses an existing pair if the packet belongs to an ongoing session).

The process then replaces (at 1610) the destination MAC address of the packet to the MAC address of the requested service VM. The process then stores (at 1615) the mapping of the replacement IP address:port number pair to tenant VM's actual IP address, port number, and MAC address.

Figure 17:
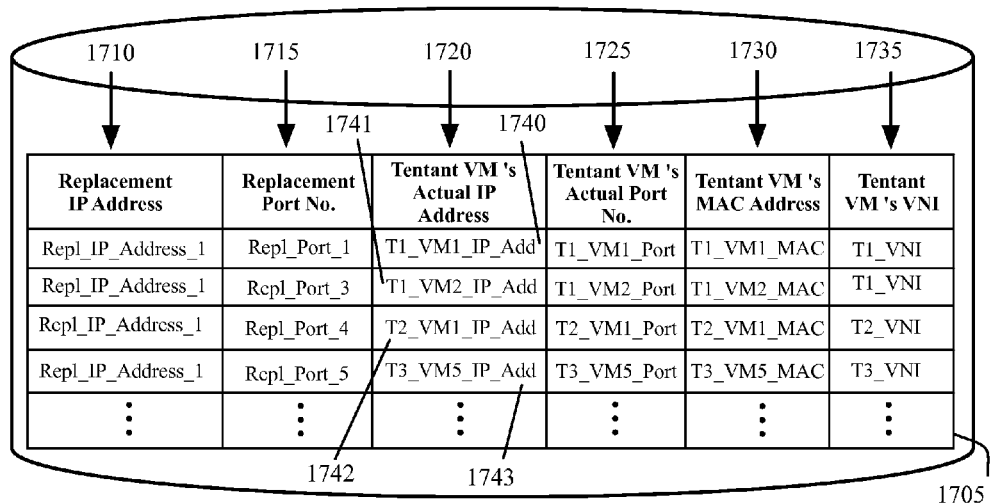
FIG. 17 conceptually illustrates IP mappings of active sessions maintained by a NAT agent in some embodiments of the invention.

FIG. 17 conceptually illustrates IP mappings of active sessions maintained by a NAT agent in some embodiments of the invention. As shown, the IP mapping 1705 maps each pair of replacement IP address 1710 and replacement port number 1715 to tenant VM's actual IP address 1720, tenant VM's actual port number 1725, and tenant VM's MAC address 1730. The IP mapping in some embodiments optionally includes the VNI (1735) of the requesting tenant VM's logical network. The actual IP address and port number of the tenant VM are the IP address and port number that are assigned to the VM in the VM's logical network.

Referring back to FIG. 16, the process then associates (at 1620) the requested service VNI with the packet metadata. For instance, the process adds an attribute to the packet data structure in the network stack (i.e., the attribute is not in the packet frame but in the packet metadata). Since the packet has the same VNI as the requested cloud service, the packet can be forwarded to the service VM by virtual L2 network layer. In other words, since the packet has the same VNI as the requested cloud service, the packet is effectively on the same logical L2 network as the requested cloud service.

The process then provides information (at 1625) for sending packets that are destined to the service VM's VNI and specify the requested service's MAC address as the destination MAC address through a tunnel to the requested service's host IP address. For instance, the process creates a tunneling rule by adding an entry on uplink encapsulation logic to create a tunnel (or reuse the tunnel if a tunnel is already setup by another tenant VM on the requesting tenant' host to the requested service VM's host) for sending the packets that are destined from the requesting tenant's VM to the service VM's VNI and specify the requested service's MAC address as the destination MAC address. The process then ends.

Figure 18:
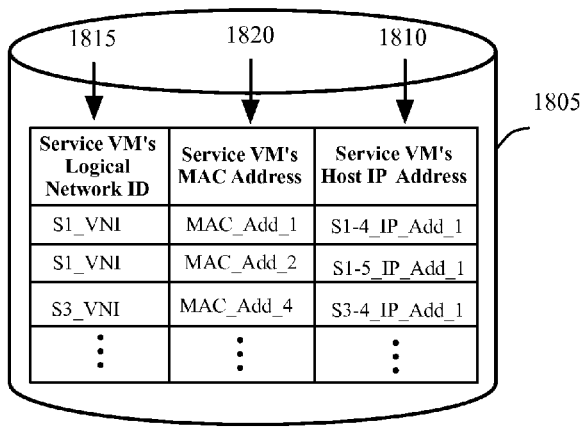
FIG. 18 conceptually illustrates the tenant virtual machine to service virtual machine tunneling rules generated by a NAT agent in some embodiments of the invention.

FIG. 18 conceptually illustrates the tenant VM to service VM tunneling rules generated by a NAT agent in some embodiments of the invention. The rules in some embodiments are utilized by the uplink encapsulation logic to determine the mapping from a service destination specified by a tenant VM to a tunnel used to send the packet to the destination.

As shown, the rules 1805 specify service VM's VNI address 1815 and service VM's MAC address 1820. The service VM's host IP address 1810 is also provided for establishing a tunnel.

Some embodiments use the same replacement IP address for two different VMs on the same host. The two VMs may belong to the same tenant (and the same logical network) or may belong to two different tenants (and two different logical networks). As described above, the NAT agent replaces (at 1605) the source IP address and port number of the requesting tenant VM with an available replacement IP address and replacement port number pair. As shown in FIG. 17, the same replacement IP address (in the example of FIG. 17, Repl_IP Address_1 in column 1710) is used for several different tenant VMs. Specifically, the same replacement IP address (i.e., Repl_IP Address_1) is used to replace the source IP address T1-VM1_IP$_{13}$ Add 1740 (e.g., IP address of VM1 of Tenant T1), source IP address T1-VM2_IP Add 1741 (e.g., IP address of VM2 of Tenant T1), source IP address T2-VM1_IP Add 1742 (e.g., IP address of VM1 of Tenant T2), and source IP address T3-VM5_IP Add 1743 (e.g., IP address of VMS of Tenant T3). The first two source IP addresses (1740 and 1741) belong to two VMs of the same tenant (as shown in column 1735 both VMs have the same VNI, which indicates both VMs belong to the logical network of the same tenant). In contrast, the third source IP address 1742 and the fourth source IP address 1743 belong to two logical networks of two other tenants (as shown in column 1735, each VM is associated with a different VNI and therefore a different logical network and a different tenant).

As an example, process 1500 (and process 1600, which provides further details for operation 1520) receives a first packet from a first VM of a first tenant logical network that is hosted on a particular host. The first packet includes a first source IP address and a first source port number associated with the first VM. The packet also specifies a destination address associated with a first service VM of a service logical network.

The process replaces (at 1520 and 1605) the source IP address of the first packet with a first replacement IP address and the first source port number with a first replacement port number. The process then sends the first packet to the first service VM.

The process then receives a second packet from a second VM of a second tenant logical network that is hosted on the same particular host. The first and second VMs are different VMs and may belong to the same tenant (i.e., the first and second tenants and their logical networks are the same) or different tenants (i.e., the first and second tenants and their logical networks are different). The second packet includes a second source IP address and a second source port number associated with the second VM. The second packet also specifies a destination address associated with a second service VM (which may or may not be the same as the first service VM).

The process replaces (at 1520 and 1605) the source IP address of the second packet with the same first replacement IP address that was used to replace the source IP address in the first packet. The process replaces the second source port number with a second replacement port number (which is different than the first replacement port number). The process then sends the second packet to the second service VM.

Figure 19:
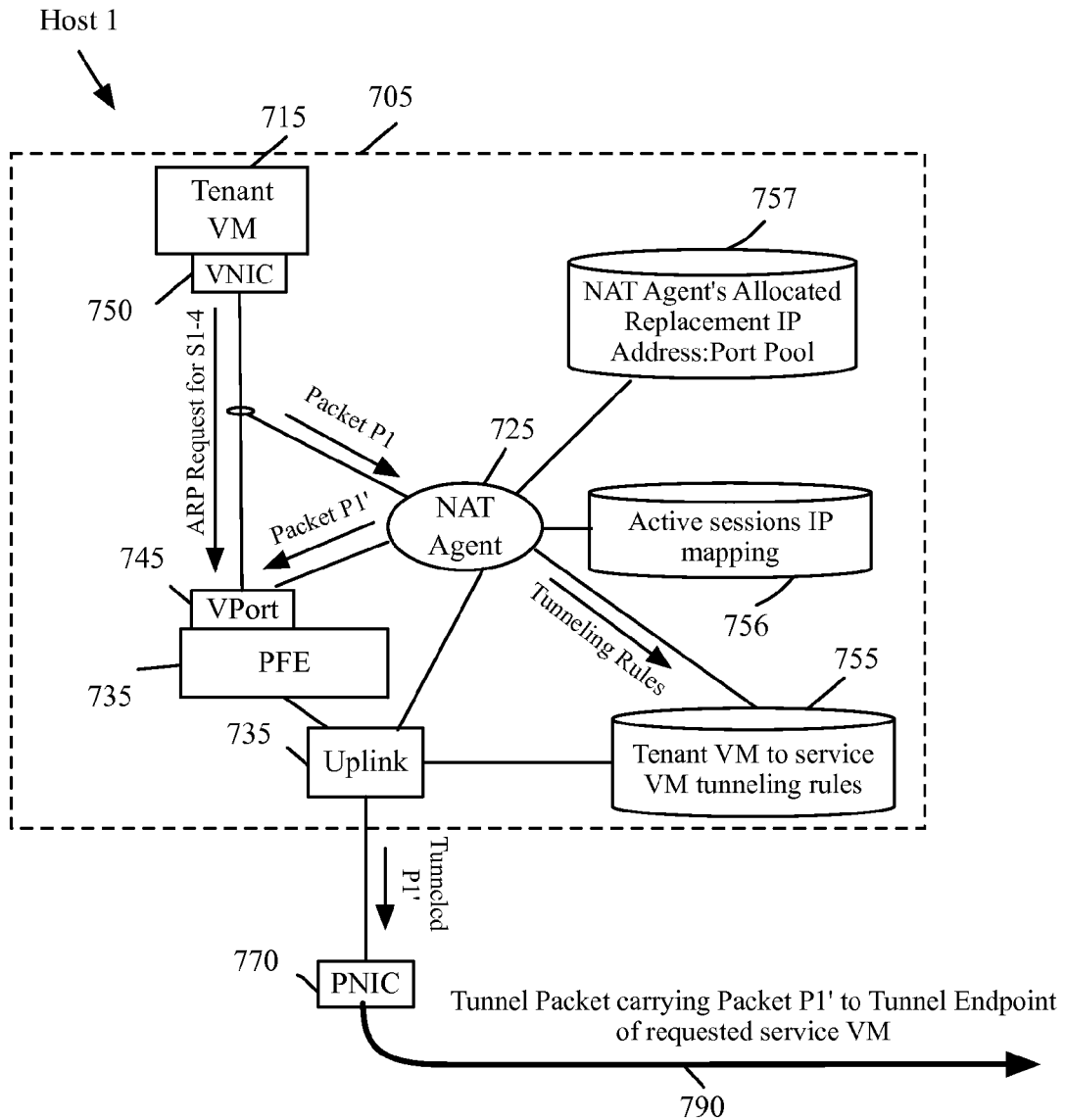
FIG. 19 conceptually illustrates an example of a tenant virtual machine that is sending a packet to a service VM on a different host through a direct tunnel between the hosts in some embodiments of the invention.

FIG. 19 conceptually illustrates an example of a tenant VM that is sending a packet to a service VM on a different host through a direct tunnel between the hosts in some embodiments of the invention. As shown, tenant VM 715 sends an address resolution protocol (ARP) request for the MAC address of the default gateway. An ARP request is used for resolution of network layer (L3) addresses (e.g., network address or IP address) into link layer (L2) addresses (e.g., Ethernet address or MAC address). NAT agent 725 ignores the ARP request.

Subsequently, the NAT agent intercepts a packet P1 that specifies the IP address of a requested service VM as the destination IP address and the MAC address of the default gateway as the destination MAC address. The NAT agent replaces the source IP address and source port number of the packet P1 with a pair of replacement IP address and replacement port number from the NAT agent's allocated replacement IP address:port number pool 757. The NAT agent also replaces the MAC address of the default gateway with the MAC address of the service VM (the NAT agent prevents the packet to be forwarded to the default gateway).

The NAT agent sends the modified packet P1' through the PFE 735 (e.g., through the VPort 745 or by directly sending the modified packet to the PFE) to the uplink 735. The NAT agent also updates the tunneling rules 755 and the active session IP mapping 756 if necessary. The uplink 735 encapsulates and sends the packet P1' through the tunnel 790 to the tunnel's destination endpoint on the requested service VM.

Figure 20:
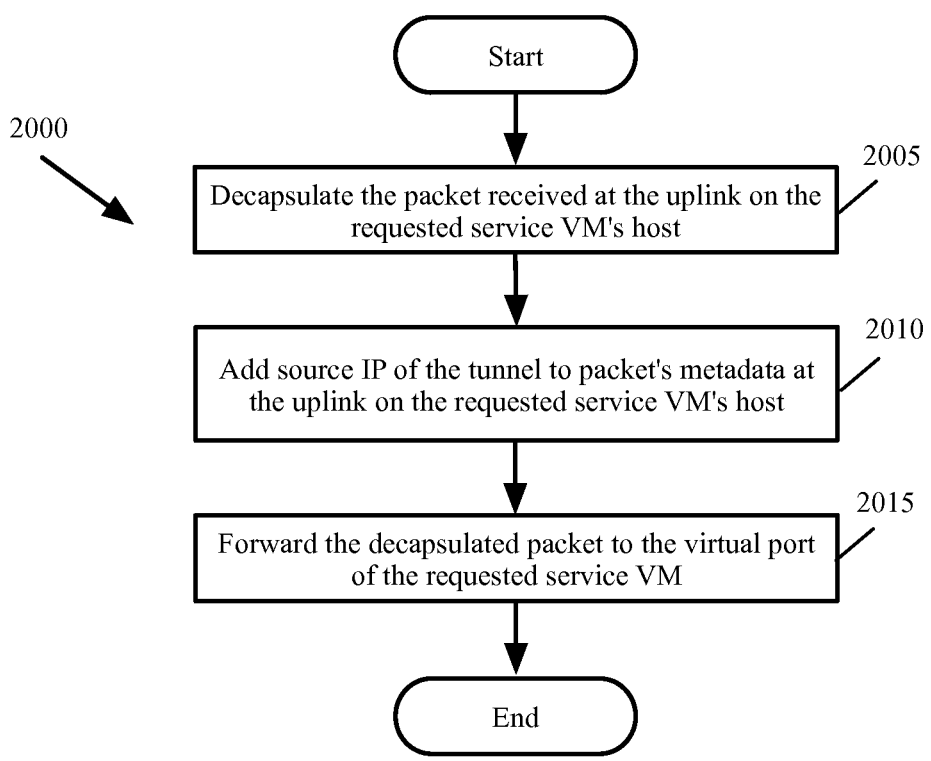
FIG. 20 conceptually illustrates a process for receiving a packet at a service virtual machine in some embodiments of the invention when the requesting tenant and the requested service virtual machine are not on the same host and the packet is received through a tunnel between the two hosts.

III. Receiving a Packet from a Tenant Virtual Machine at a Service Virtual Machine FIG. 20 conceptually illustrates a process 2000 for receiving a packet at a service VM in some embodiments of the invention when the requesting tenant and the requested service VM are not on the same host and the packet is received through a tunnel between the two hosts.

As shown, the process decapsulates (at 2005) the packet received at the uplink on the requested service VM's host. The process then adds (at 2010) the source IP of the tunnel to the packet's metadata at the uplink on the requested service VM's host and saves the mapping of the replacement IP and replacement port number of the requesting tenant to the tunnel's source IP address.

The process then forwards (at 2015) the decapsulated packet to the virtual port of the requested service VM. The process then ends.

Figure 21:
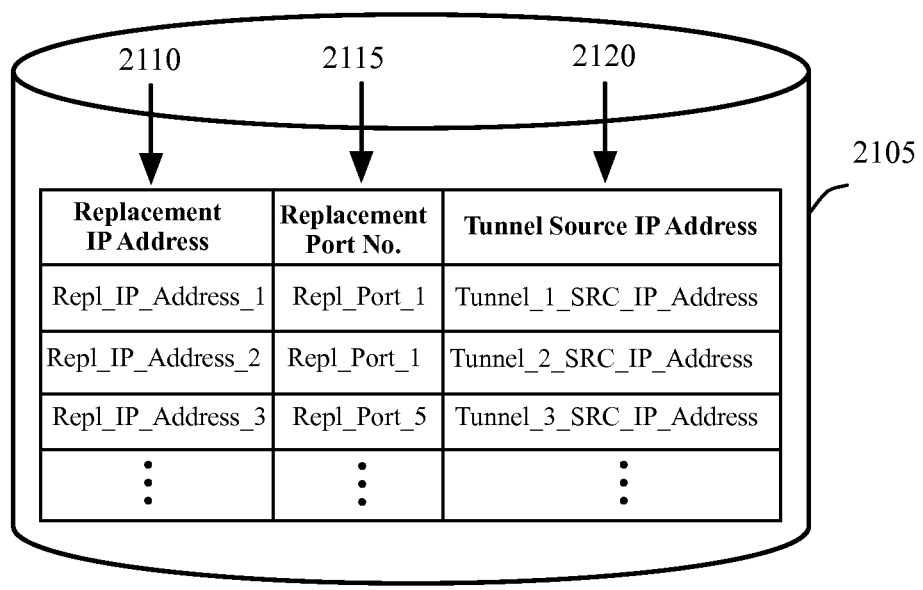
FIG. 21 conceptually illustrates the mapping from the replacement IP address and port number pair to the tunnel's source IP address in some embodiments of the invention.

FIG. 21 conceptually illustrates the mapping 2105 from the replacement IP address:port number pair to the tunnel's source IP address in some embodiments of the invention. As shown, the replacement IP address 2110 and the replacement port 2115 of each requesting tenant VM is mapped to a tunnel's source IP address 2120. This mapping is used by the uplink for sending back the reply packets that are addressed to each replacement IP address:port number pair through the corresponding tunnel.

Figure 22:
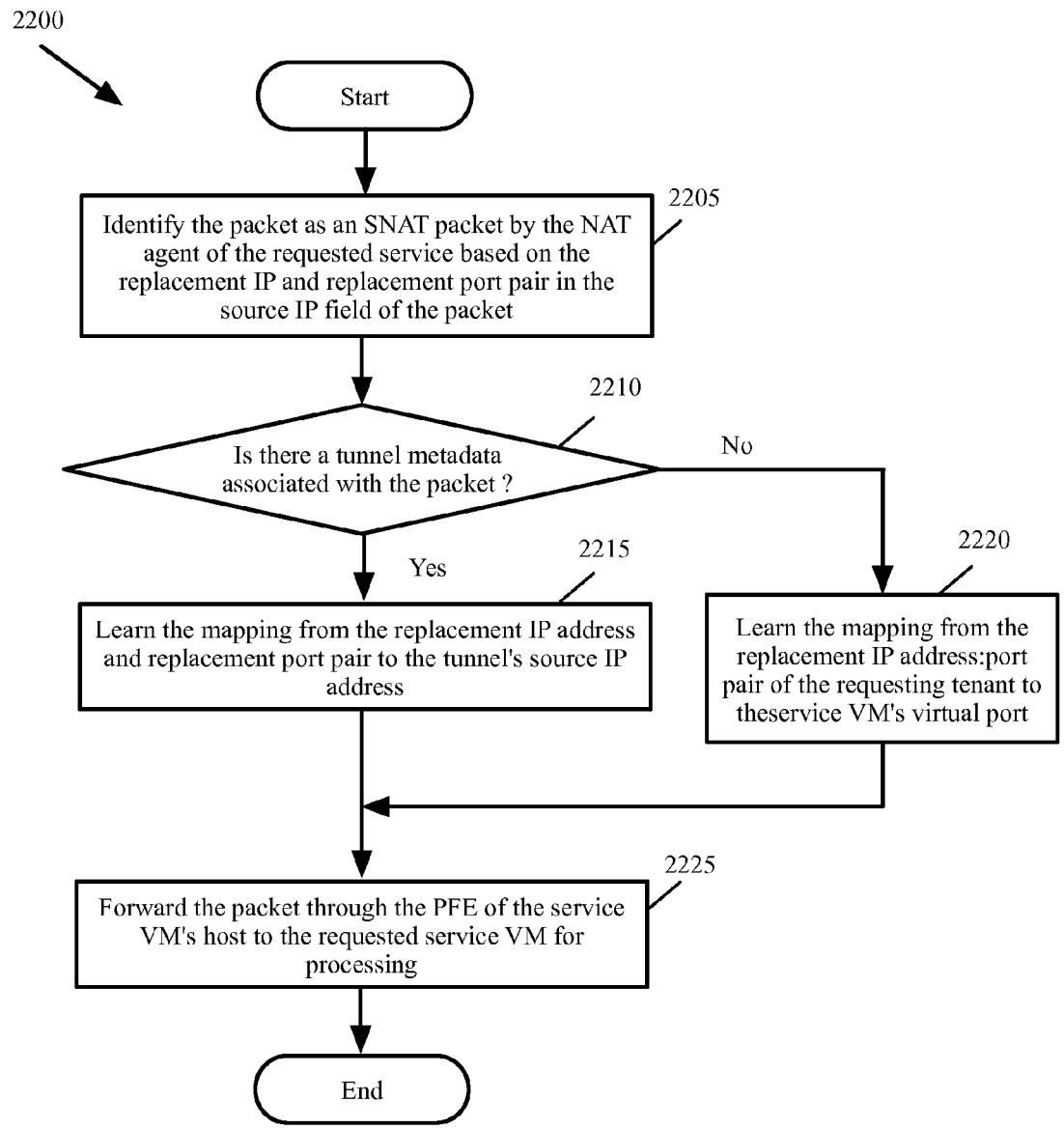
FIG. 22 conceptually illustrates a process for processing a packet by the NAT agent at the host of a service virtual machine in some embodiments of the invention.

FIG. 22 conceptually illustrates a process 2200 for processing a packet by the NAT agent at the host of a service VM in some embodiments of the invention. As shown, the process identifies (at 2205) the packet by the NAT agent of the requested service VM as an SNAT packet (i.e., as a packet that has gone through SNAT at the host of the source VM) based on the replacement IP and replacement port number pair in the source IP field of the packet. For instance, the process utilizes the information in the allocated replacement IP address:port number list described above by reference to FIG. 8.

The process then determines (at 2210) whether there is a tunnel metadata associated with the packet. Existence of tunnel metadata indicates that the tenant and service VMs are not on the same host. If so, the process learns (at 2215) the mapping from the replacement IP address and replacement port number pair to the tunnel's source IP address (e.g., the IP address of the source host). The process then proceeds to 2225, which is described below.

Otherwise, the tenant and service VMs are and the same host. If so, the process learns (at 2220) the mapping from the replacement IP address:port number pair of the requesting tenant to the service VM's virtual port. The process forwards (at 2225) the packet through the PFE of the service VM's host to the requested service VM for processing. The process then ends.

Figure 23:
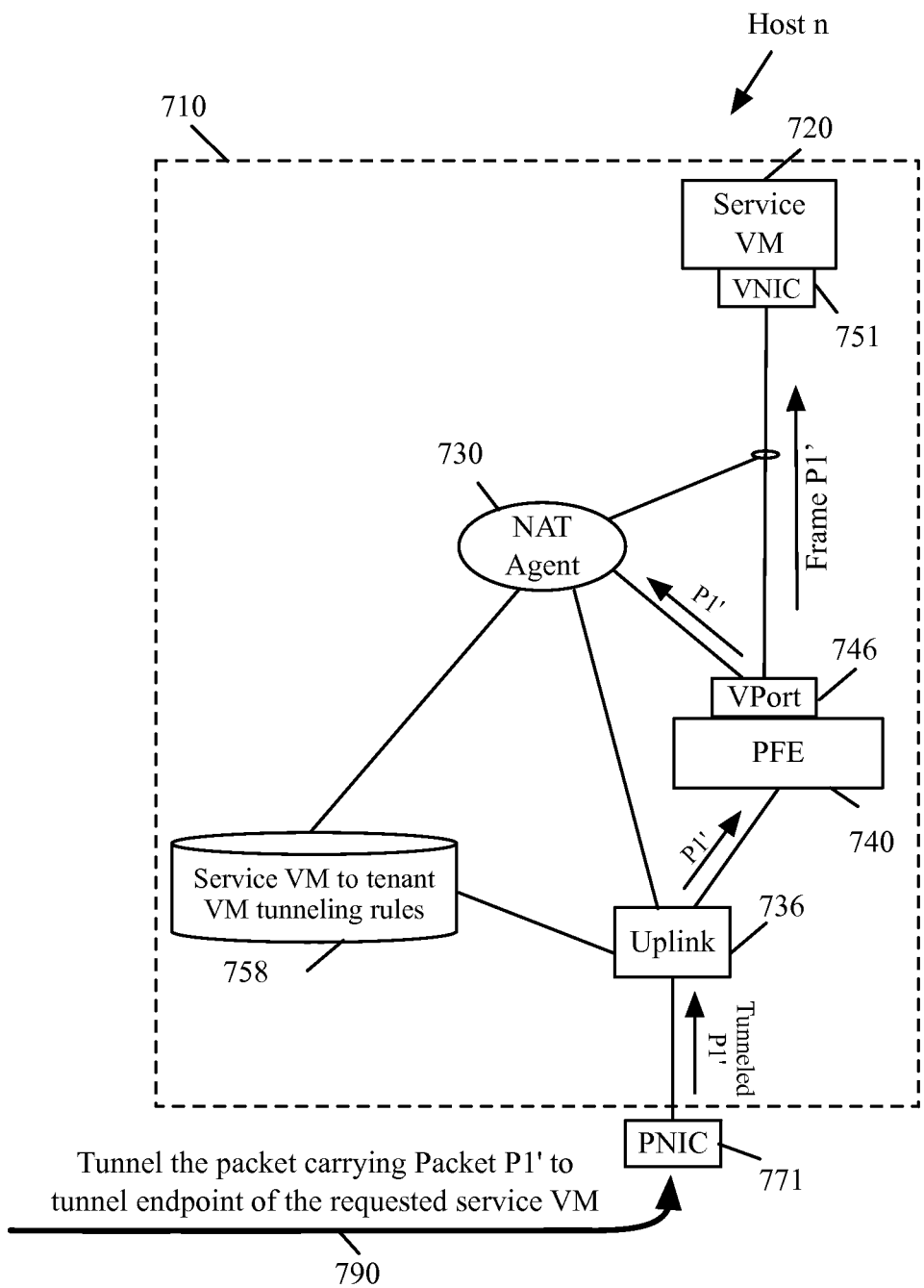
FIG. 23 conceptually illustrates an example of a service virtual machine that has received a packet from a tenant virtual machine on a different host through a direct tunnel between the hosts in some embodiments of the invention.

FIG. 23 conceptually illustrates an example of a service VM that has received a packet from a tenant VM on a different host through a direct tunnel between the hosts in some embodiments of the invention. FIG. 23 shows the requesting VM side of the tunnel 790 of FIG. 19. As shown in FIG. 23, the packet P1' (that includes a pair of replacement IP address and replacement port number) is received through the tunnel 790 at the PNIC 771 and is forwarded to the uplink 736. The uplink decapsulates the packet and sends it to the PFE 740. The PFE 740 sends the packet to the service VM 720 through the corresponding VPort 746 and VNIC 751. The packet P1' received at the service VM includes the replacement IP address:port number pair that was allocated to the requesting tenant VM.

The NAT agent 730 also examines the packet P1' and updates the tunneling rules 758 for sending reply packets from the service VM 720 to the requesting tenant VM through the same tunnel 790.

Figure 24:
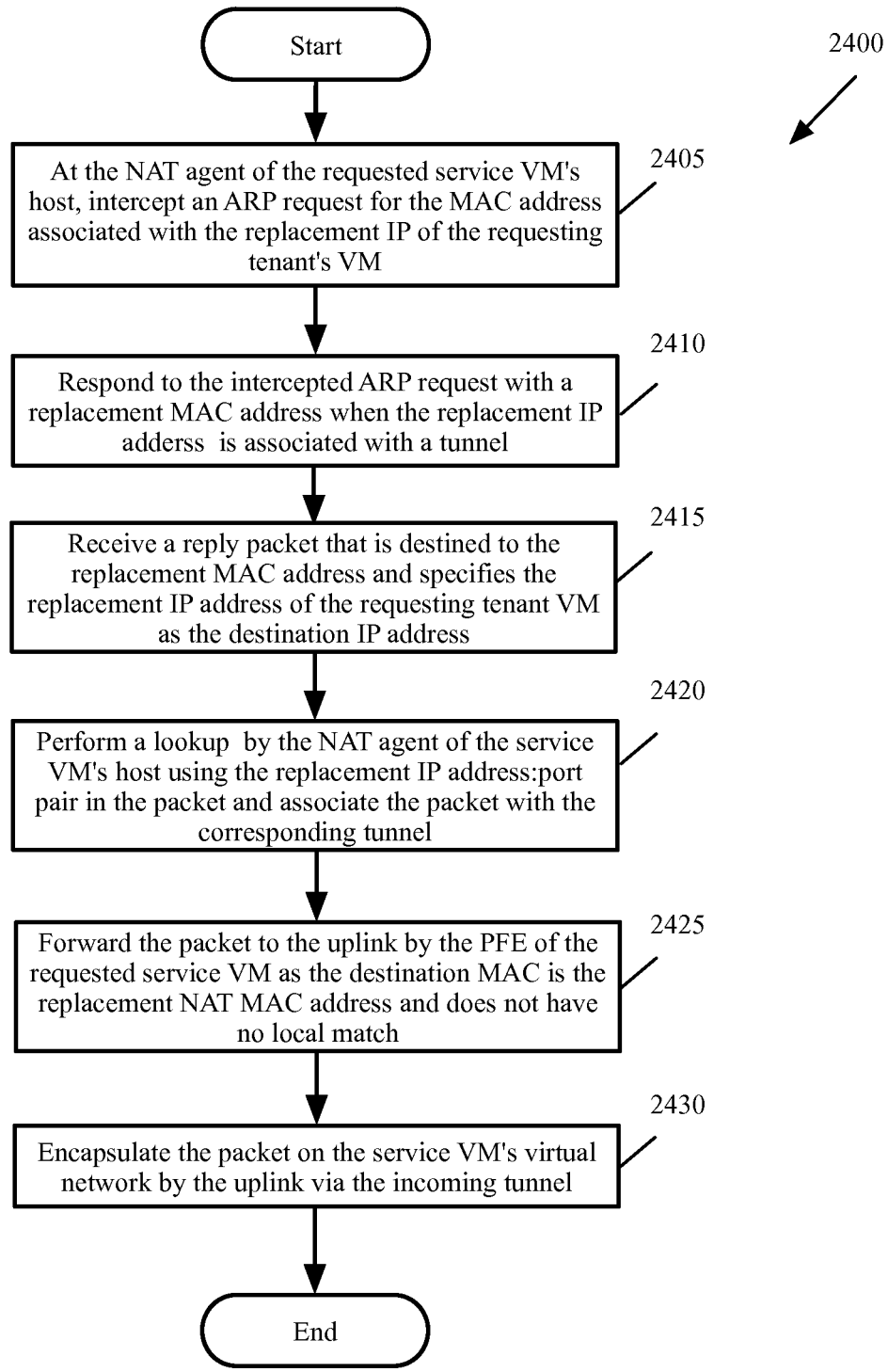
FIG. 24 conceptually illustrates a process for sending a reply packet from a service virtual machine to a requesting tenant virtual machine when the service virtual machine and the tenant virtual machine are not on the same host in some embodiments of the invention.

IV. Sending a Reply Packet from a Service Virtual Machine to a Tenant Virtual Machine FIG. 24 conceptually illustrates a process 2400 for sending a reply packet from a service VM to a requesting tenant VM when the service VM and the tenant VM are not on the same host in some embodiments of the invention. As shown, the process, at the NAT agent of the requested service VM's host, intercepts (at 2405) an ARP request for the MAC address associated with the replacement IP of the requesting tenant's VM.

The process responds (at 2410) to the intercepted ARP request with a replacement MAC address when the replacement IP address is associated with a tunnel. For instance, the process searches the mapping table 2105 described by reference to FIG. 21 to determine that the replacement IP address is associated with a tunnel.

The replacement MAC address in some embodiments is a single address used throughout the virtualized infrastructure domain. The purpose of the replacement MAC address is to make the PFE to always forward service reply packets to uplink when the requesting VM and service VM are on different hosts (as further described by reference to 2425, below).

Next, the process receives (at 2415) a reply packet that is destined to the replacement MAC address and specifies the replacement IP address of the requesting tenant VM as the destination IP address. The process then performs (at 2420) a lookup by the NAT agent of the service VM's host by using the replacement IP address:port number pair in the packet and associate the packet with the corresponding tunnel. For instance, the process uses the mapping table 2105 described by reference to FIG. 21 to find the corresponding tunnel a tunnel.

The process then forwards (at 2425) the packet to the uplink by the PFE of the requested service VM as the destination MAC is the replacement NAT MAC address and does not have a local match. The process then encapsulates (at 2430) the packet on the service VM's virtual network by the uplink via the incoming tunnel (the encapsulated packet will include service VM's VNI). The process then ends.

Figure 25:
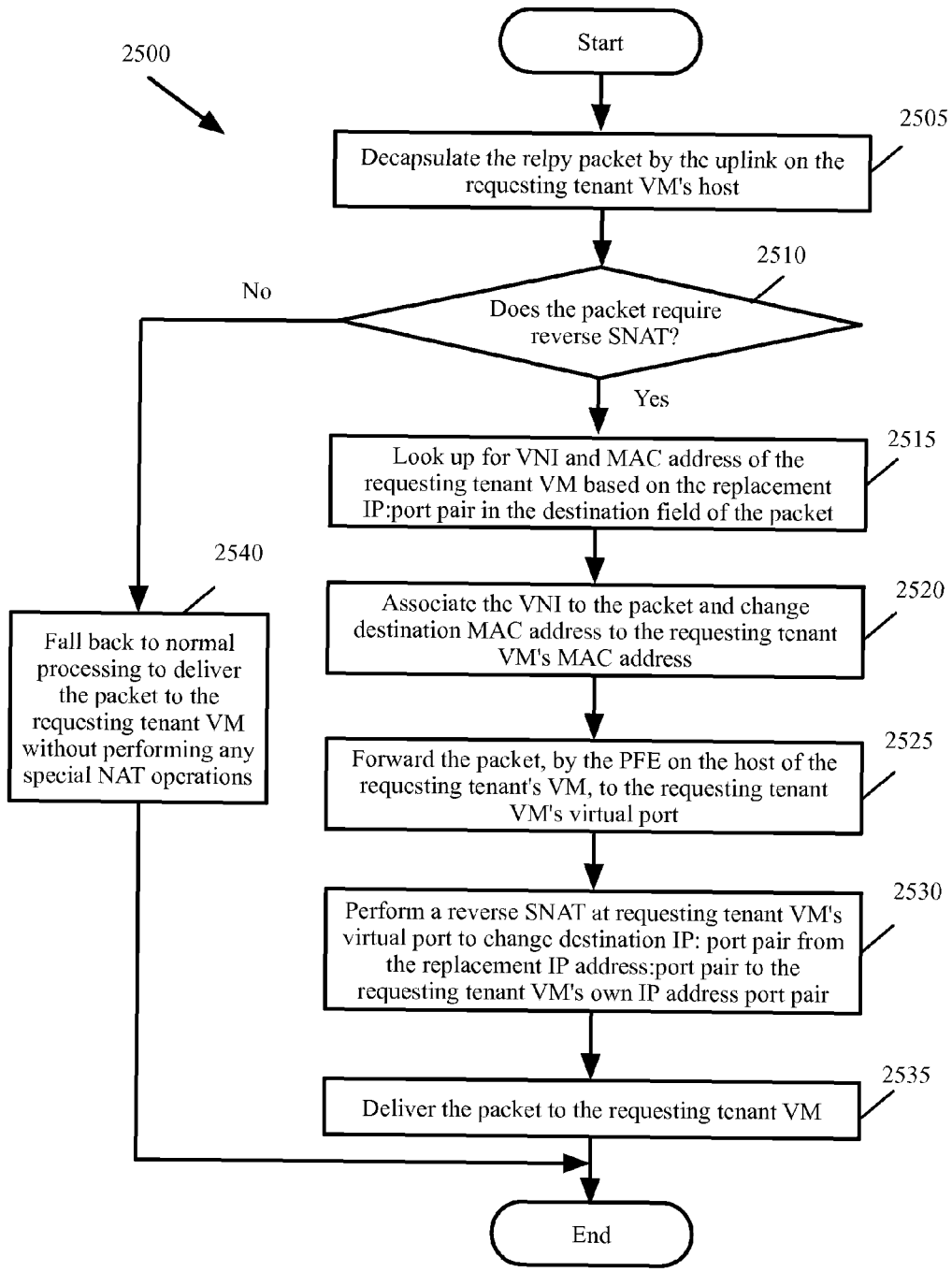
FIG. 25 conceptually illustrates a process for receiving a reply packet from a service virtual machine that resides on a different host in some embodiments of the invention.

FIG. 25 conceptually illustrates a process 2500 for receiving a reply packet from a service VM that resides on a different host in some embodiments of the invention. As shown, the process decapsulates (at 2505) the reply packet by the uplink on the requesting tenant VM's host. The process then determines (at 2510) whether the packet requires reverse SNAT. For instance, the process determines whether the destination MAC address is the replacement MAC address as described by reference to 2410, above.

If not, the process falls back (at 2540) to normal processing (i.e., the process performs prior art operations to deliver the reply packet without performing the SNAT operations disclosed herein) to deliver the packet to the requesting tenant VM without performing any special NAT operations. the process then ends.

Otherwise, the process looks up (at 2515) for the VNI and MAC address of the requesting tenant VM based on the replacement IP:port number pair in the destination field of the packet (e.g., by using table 1705 described by reference to FIG. 17 above). The process then associates (at 2520) the VNI to the packet and changes destination MAC address from the replacement MAC address to the requesting tenant VM's MAC address.

The process then forwards (at 2525) the packet, by the PFE on the host of the requesting tenant's VM, to the requesting tenant VM's virtual port. Next, the process performs (at 2530) a reverse SNAT at the requesting tenant VM's virtual port to change destination IP address:port number pair from the replacement IP address:port number pair to the requesting tenant VM's own IP address port number pair. The process then delivers (at 2535) the packet to the requesting tenant VM. The process then ends.

Figure 26:
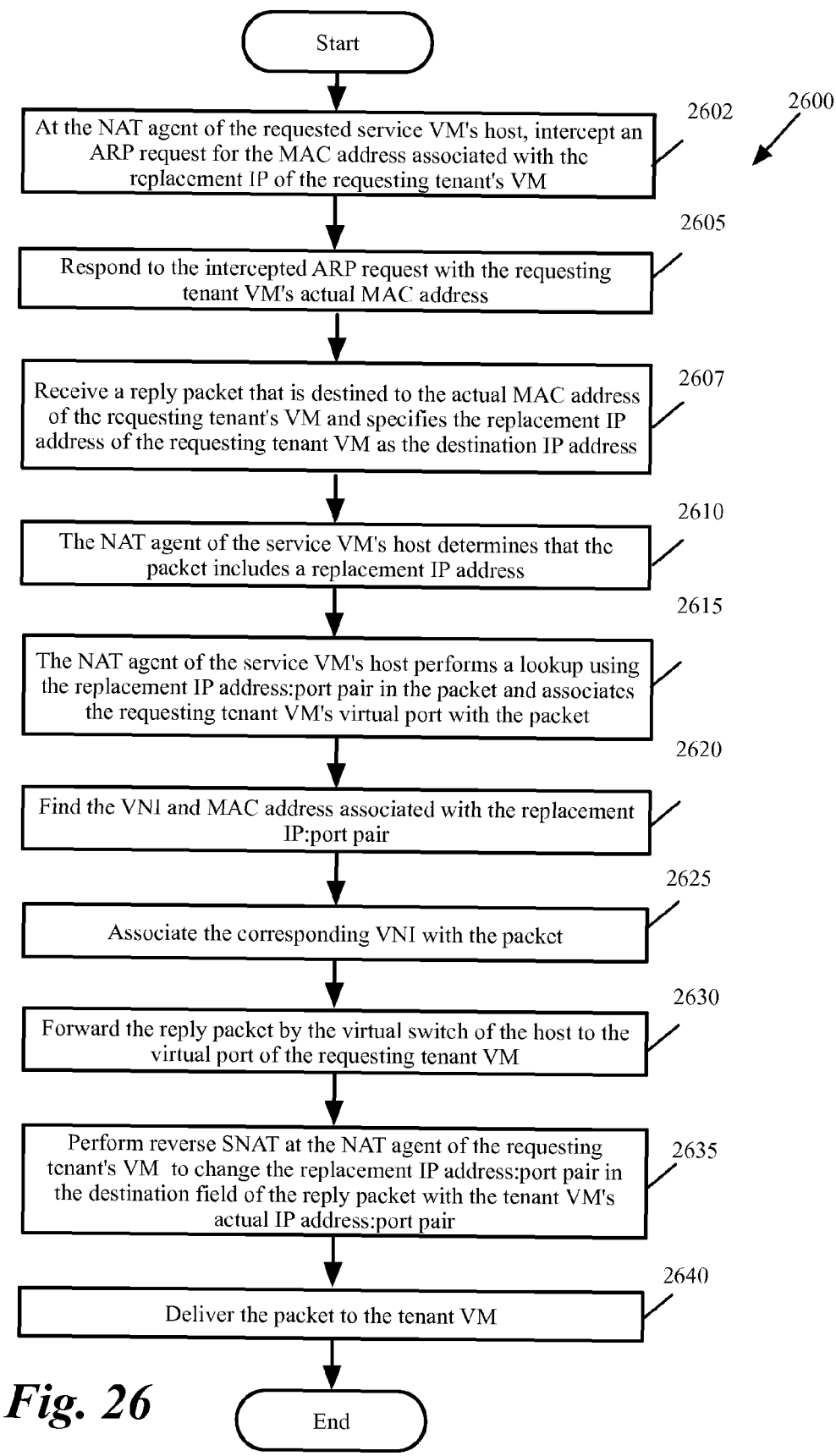
FIG. 26 conceptually illustrates a process for sending a reply packet from a service virtual machine to a requesting tenant virtual machine when the service virtual machine and the tenant virtual machine are on the same host in some embodiments of the invention.

FIG. 26 conceptually illustrates a process 2600 for sending a reply packet from a service VM to a requesting tenant VM when the service VM and the tenant VM are on the same host in some embodiments of the invention. As shown, the process, at the NAT agent of the requested service VM's host intercepts (at 2602) an address resolution protocol (ARP) request for the MAC address associated with the replacement IP of the requesting tenant's VM.

The process responds (at 2605) to the intercepted ARP request with the requesting tenant VM's actual MAC address (e.g., by using table 1705 described above by reference to FIG. 17). The process receives (at 2607) a reply packet that is destined to the actual MAC address of the requesting tenant's VM and specifies the replacement IP address of the requesting tenant VM as the destination IP address.

The process, at the NAT agent of the service VM's host, determines (at 2610) that the packet includes a replacement IP address. The process then performs (at 2615) a lookup by the NAT agent. The loop up uses the replacement IP address: port number pair and associates the packet with the requesting tenant VM's virtual port (e.g., by using table 1705 described above by reference to FIG. 17).

The process then finds (at 2620) the VNI and MAC address associated with the replacement IP address:port number pair (e.g., by using table 1705 described above by reference to FIG. 17). The process then associates (at 2625) the corresponding VNI with the packet. Next, the process forwards (at 2630) the reply packet by the PFE of the host to the virtual port of the requesting tenant VM.

The process then performs (at 2630) reverse SNAT at the NAT agent of the requesting tenant's VM to change the replacement IP address:port number pair in the destination field of the reply packet with the tenant VM's actual IP address:port number pair. The process then delivers (at 2640) the packet to the tenant VM. The process then ends.

Figure 27:
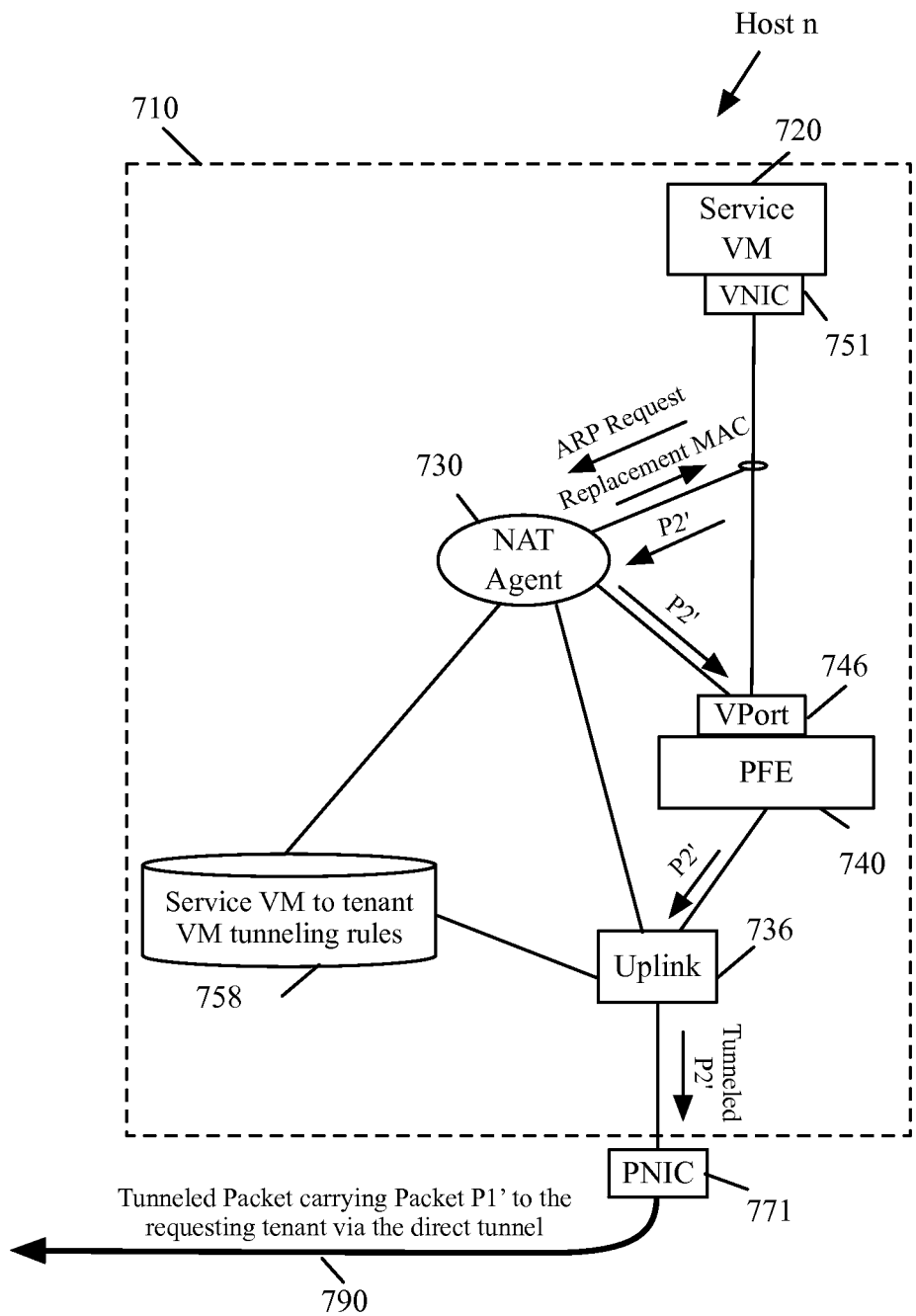
FIG. 27 conceptually illustrates an example of a service virtual machine sending a reply packet to a tenant virtual machine on a different host through a direct tunnel between the hosts in some embodiments of the invention.

FIG. 27 conceptually illustrates an example of a service VM sending a reply packet to a tenant VM on a different host through a direct tunnel between the hosts in some embodiments of the invention. FIG. 27 shows the same host as in FIG. 23 where the requested service VM is sending a reply packet P2' to the requesting tenant VM.

As shown, the NAT agent 730 intercepts an ARP request for the MAC address corresponding to the replacement IP address of the requesting tenant VM. The NAT agent responds to the ARP request by sending the replacement (or fake) MAC address.

At a later time, the requested service VM 720 sends a replay packet P2' that is destined to the replacement MAC address and also includes the replacement IP address and replacement port number pair of the requesting tenant VM as the IP address and the port number of the destination VM. The NAT agent 730 intercepts the packet P2' and identifies the corresponding tunnel by searching through the tunneling rules 758.

The NAT agent forwards the packet to the PFE 740 (e.g., through the VPort 746). Since the destination MAC address is the replacement MAC address (which does not exist on the local host), the PFE forwards the packet to the uplink 736. The uplink 736 encapsulates the packet and sends to the requesting tenant VM through the direct tunnel 790.

Figure 28:
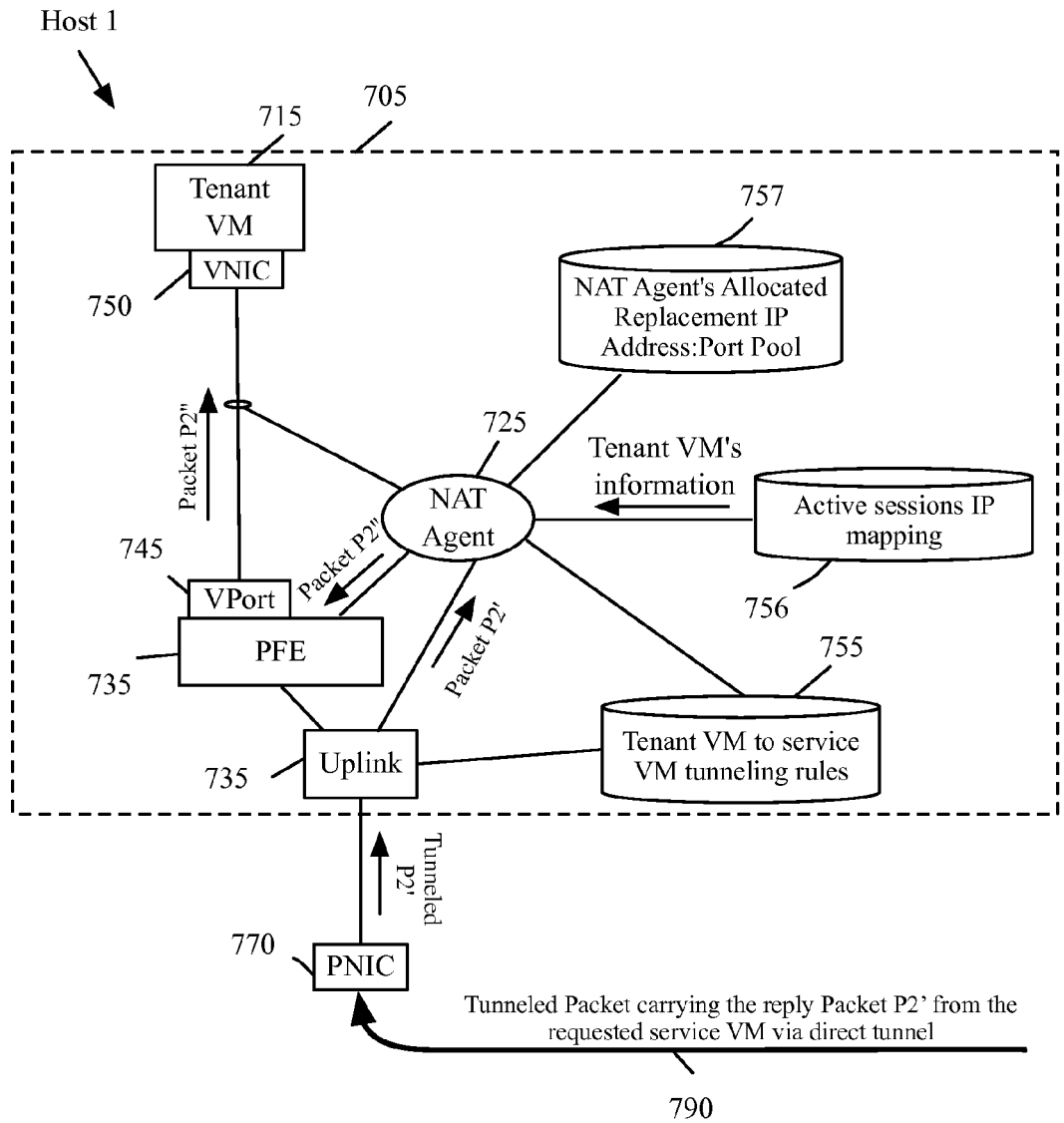
FIG. 28 conceptually illustrates an example of a tenant virtual machine receiving a reply packet from a requested service virtual machine on a different host through a direct tunnel between the hosts in some embodiments of the invention.

FIG. 28 conceptually illustrates an example of a tenant VM receiving a reply packet from a requested service VM on a different host through a direct tunnel between the hosts in some embodiments of the invention. FIG. 28 shows the tenant host side of as in FIG. 27 where the requesting tenant VM's host has received the reply packet from the requested service VM.

As shown in FIG. 28, the reply packet P2' is received through the tunnel 790 and is forwarded to the uplink 735 by the PNIC 770. The uplink 735 decapsulates the packet. The NAT agent 725 intercepts the packet at the uplink and searches the active session IP mapping database 756 and finds the VNI and the MAC address of the requesting tenant VM.

The NAT agent 725 replaces the destination MAC address of the packet with the MAC address of the requesting tenant VM and associates the packet with the requesting tenant VM's VNI. The NAT agent sends the modified packet P2" to the PFE. The PFE forwards the packet to the requesting tenant VM 715 through the VPort 745 and the VNIC 750.

Figure 29:
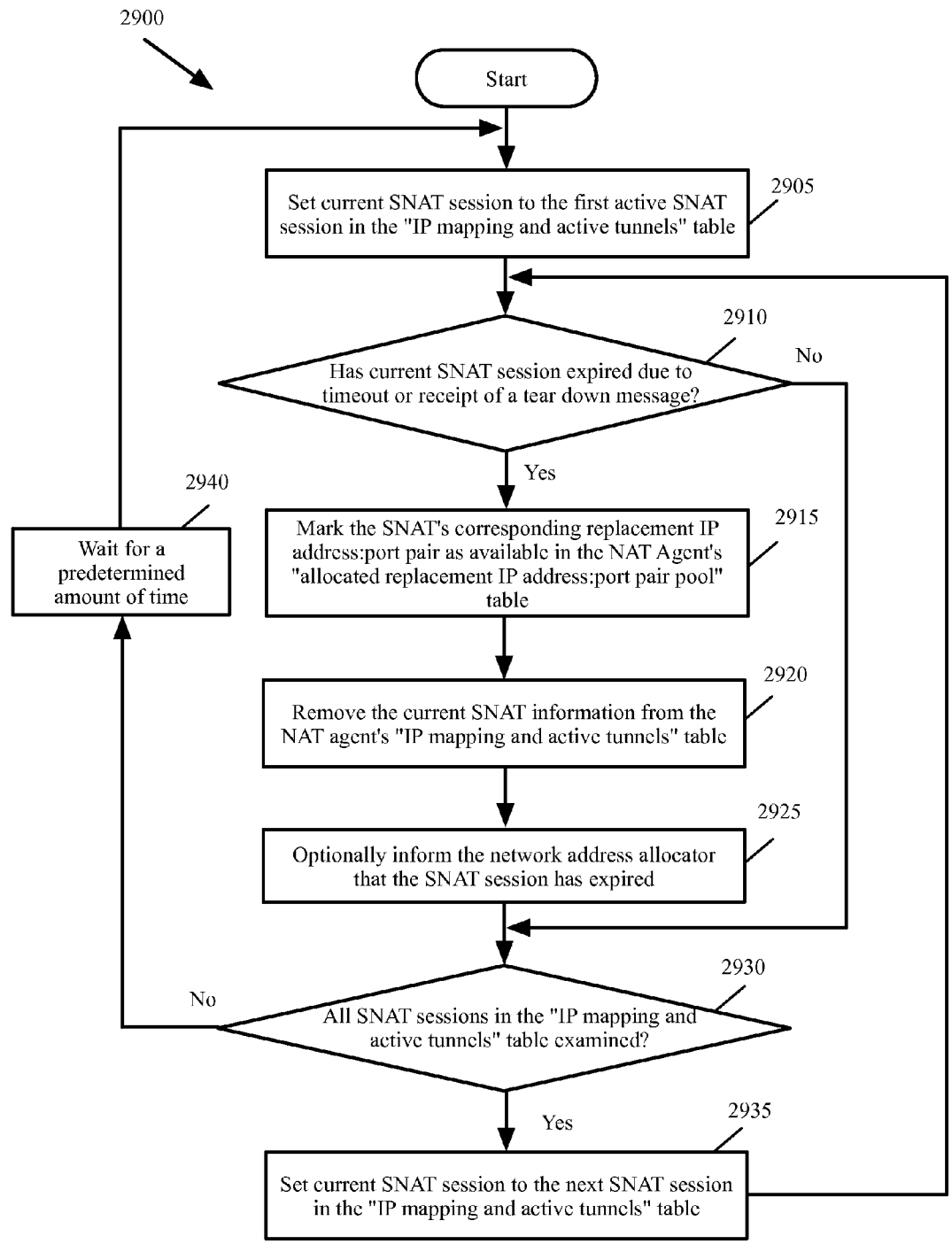
FIG. 29 conceptually illustrates a process for managing the life cycle of the replacement IP addresses and replacement port number pairs.

FIG. 29 conceptually illustrates a process 2900 for managing the life cycle of the replacement IP addresses and replacement port number pairs. The process in some embodiments is performed by a NAT agent that examines each active session periodically to determine whether or not to reclaim the replacement IP address:port number pairs of the timed out or expired sessions. As shown, the process sets (at 2905) the current SNAT session to the first active session in the "IP mapping and active tunnels" table (e.g., table 1705 described above by reference to FIG. 17).

The process then determines (at 2910) whether the current SNAT session has expired due to timeout of the receipt of a tear down message. If not, the process proceeds to 2930, which is described below. Otherwise, the process marks (at 2915) the SNAT's corresponding IP address:port number pair as available in the NAT agent's "allocated replacement IP address:port number pair" pool (e.g., table 1015 described above by reference to FIG. 10).

The process then removes (at 2920) the current SNAT information from the NAT agent's "IP mapping and active tunnels" table if the tunnel is not used by any other ongoing sessions. Since there might be multiple VMs on the host that share the tunnel to the same service VM, some embodiments provide a counter that shows the number of sessions using a tunnel. When a session expires, the counter is decremented by one. When the counter is zero, i.e., all sessions are timed out, then the tunnel is removed from the IP mapping and active tunnels table. The process then optionally informs (at 2925) the network address allocator that the SNAT session has expired.

The process then determines (at 2930) whether all SNAT sessions in the "IP mapping and active tunnels" table are examined. If not, the process waits (at 2940) for a predetermined amount of time and proceeds to 2905, which was described above.

Otherwise, the process sets (at 2935) the current SNAT session to the next SNAT session in the "IP mapping and active tunnels" table. The process then proceeds to 2910, which was described above.

Figure 30:
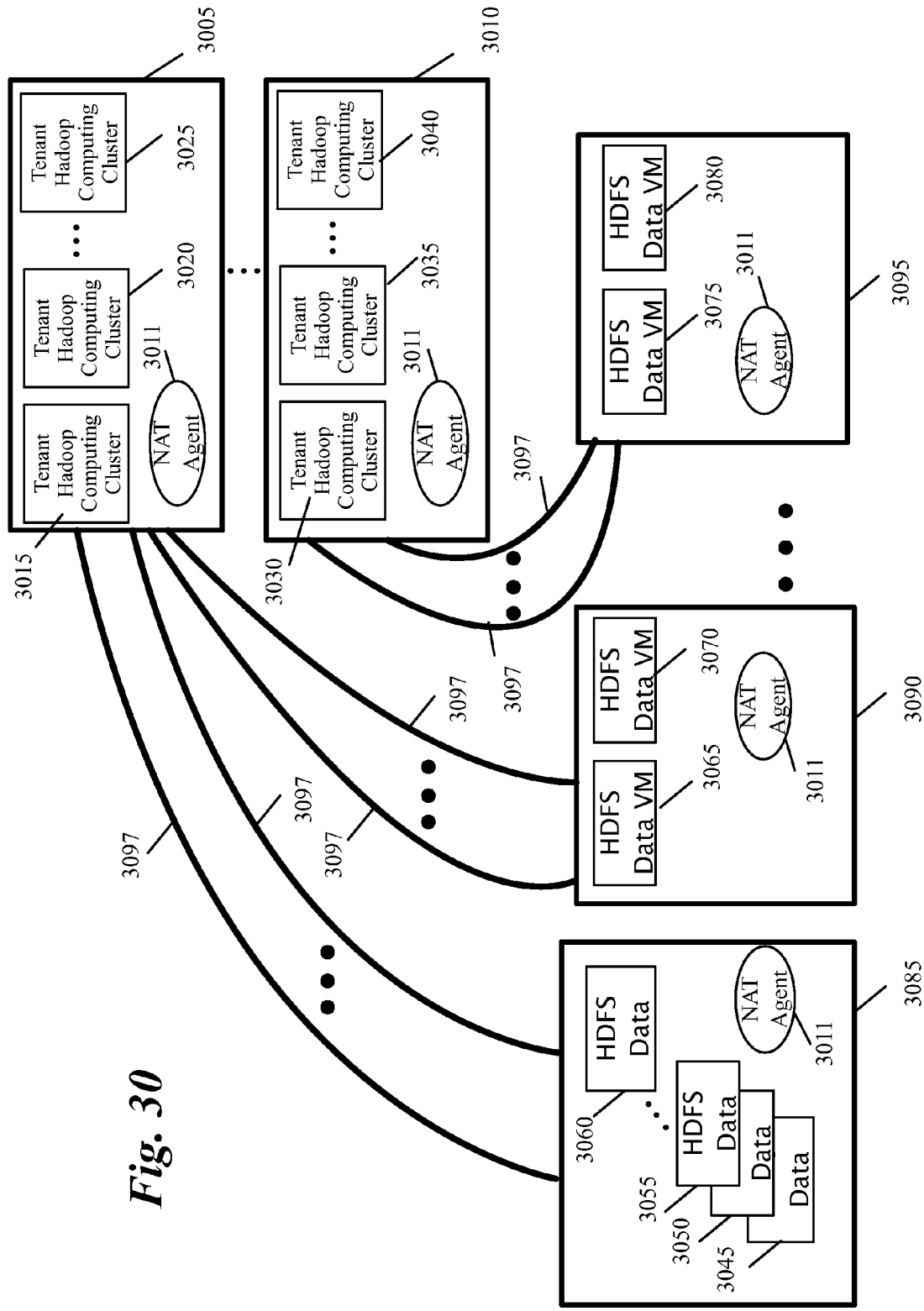
FIG. 30 conceptually illustrates a use case application for utilizing efficient access to cloud services in some embodiments of the invention.

FIG. 30 conceptually illustrates a use case application for utilizing efficient access to cloud services in some embodiments of the invention. The figure shows several tenant Hadoop computing clusters 3015-3040 on several hosts 3005-3010. The figure also shows cloud services 3045-3080 on several hosts 3085-3095. The cloud services 3045-3080 include Hadoop distributed file system (HDFS).

The Hadoop clusters may or may not belong to the logical network of the same tenant but generally do not interact with each other and are only interested in crunching the data on the shared HDFS. Each tenant Hadoop computing cluster 3015-3040 can enable efficient service to one or more of the HDFS data services and utilize direct tunnels 3097 to access data instead of going through a NAT gateway to create bottlenecks.

The NAT agents 3011 on each host perform SNAT on the packets sent from the tenant Hadoop computing clusters 3015-3040 to HDFS data VMs 3045-3080. The NAT agents also perform reverse SNAT on the reply packets.

V. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 31:
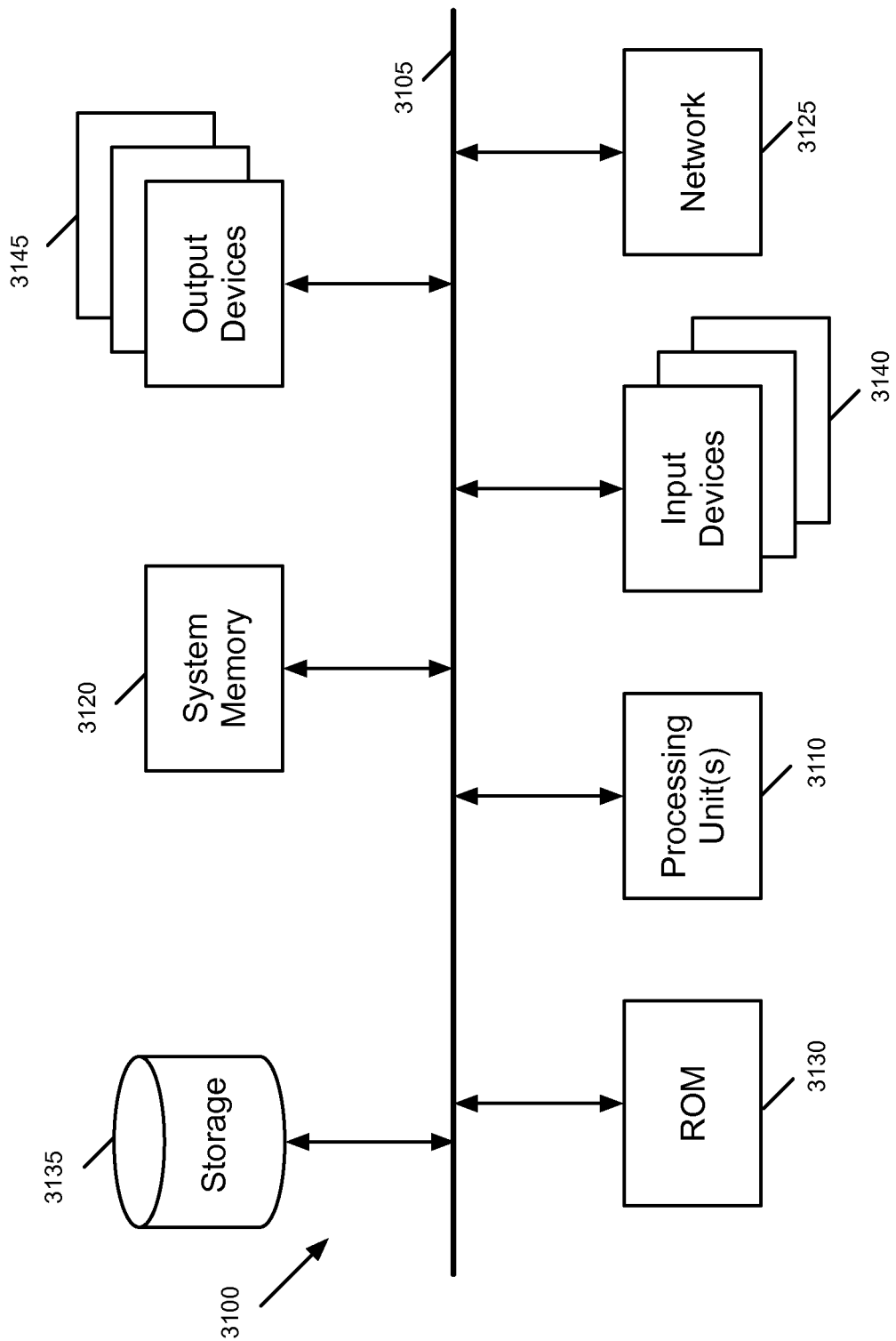
FIG. 31 conceptually illustrates an electronic system with which some embodiments of the invention are implemented.

FIG. 31 conceptually illustrates an electronic system 3100 with which some embodiments of the invention are implemented. The electronic system 3100 can be used to execute any of the control, virtualization, or operating system applications described above. The electronic system 3100 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 3100 includes a bus 3105, processing unit(s) 3110, a system memory 3125, a read-only memory 3130, a permanent storage device 3135, input devices 3140, and output devices 3145.

The bus 3105 collectively represents all system, peripheral, and chipset buses that communicatively connect the numerous internal devices of the electronic system 3100. For instance, the bus 3105 communicatively connects the processing unit(s) 3110 with the read-only memory 3130, the system memory 3125, and the permanent storage device 3135.

From these various memory units, the processing unit(s) 3110 retrieve instructions to execute and data to process in order to execute the processes of the invention. The processing unit(s) may be a single processor or a multi-core processor in different embodiments.

The read-only-memory (ROM) 3130 stores static data and instructions that are needed by the processing unit(s) 3110 and other modules of the electronic system. The permanent storage device 3135, on the other hand, is a read-and-write memory device. This device is a non-volatile memory unit that stores instructions and data even when the electronic system 3100 is off. Some embodiments of the invention use a mass-storage device (such as a magnetic or optical disk and its corresponding disk drive) as the permanent storage device 3135.

Other embodiments use a removable storage device (such as a floppy disk, flash drive, etc.) as the permanent storage device. Like the permanent storage device 3135, the system memory 3125 is a read-and-write memory device. However, unlike storage device 3135, the system memory is a volatile read-and-write memory, such a random access memory. The system memory stores some of the instructions and data that the processor needs at runtime. In some embodiments, the invention's processes are stored in the system memory 3125, the permanent storage device 3135, and/or the read-only memory 3130. From these various memory units, the processing unit(s) 3110 retrieve instructions to execute and data to process in order to execute the processes of some embodiments.

The bus 3105 also connects to the input and output devices 3140 and 3145. The input devices enable the user to communicate information and select commands to the electronic system. The input devices 3140 include alphanumeric keyboards and pointing devices (also called "cursor control devices"). The output devices 3145 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 31, bus 3105 also couples electronic system 3100 to a network 3165 through a network adapter (not shown). In this manner, the computer can be a part of a network of computers (such as a local area network ("LAN"), a wide area network ("WAN"), or an Intranet, or a network of networks, such as the Internet. Any or all components of electronic system 3100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 3, 4, 9, 13-16, 20, 22, 24-26, and 29) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

In view of the foregoing, one of ordinary skill in the art would understand that the invention is not to be limited by the foregoing illustrative details, but rather is to be defined by the appended claims.

I claim:

1. A physical computing device operating in a network within which (i) a first set of logical networks comprising a plurality of tenant virtual machines (VMs) and (ii) a second set of logical networks comprising a set of service VMs are implemented, the computing device comprising:
    a set of processing units; and
    a set of machine readable media storing, for execution by the set of processing units:
        a physical forwarding element; and
        a network address translation (NAT) agent for:
            intercepting a packet sent by a tenant VM to one of the service VMs prior to the packet leaving the physical forwarding element, the packet comprising a source network address and a source port number of the tenant VM;
            prior to the packet leaving the physical forwarding element, replacing the source network address and source port number with a replacement address and port number from a set of replacement network address and port number pairs allocated to the physical forwarding element for accessing service VMs, each replacement network address and port number pair for uniquely identifying a tenant VM across the first and second sets of logical networks; and
            providing the modified packet to the physical forwarding element for forwarding the modified packet to the service VM.

2. The physical computing device of claim 1 further comprising an uplink interface between the physical forwarding element and a physical network interface card for tunneling the packet to a host of the service VM.

3. The physical computing device of claim 1, wherein the intercepted packet further comprises a media access control (MAC) address of a NAT gateway associated with the first set of logical network, wherein the NAT agent is further for replacing the MAC address of the gateway in the packet with a MAC address of the service VM to prevent the physical forwarding element in the host from forwarding the packet to the NAT gateway.

4. The physical computing device of claim 1, wherein the NAT agent is further for:
    receiving a first set of rules for forwarding packets from VMs of a first logical network comprising a set of tenant VMs to VMs of a second logical network comprising a set of service VMs;
    receiving a set of parameters associated with the VMs of the second logical network; and
    translating, prior to intercepting the packet, the set of parameters and the first set of rules into a second set of rules, the second set of rules identifying all possible pairs of the VMs of the first logical network that are hosted on said host and the VMs of the second logical network.

5. A method of providing efficient access to service virtual machines (VMs) in a network comprising (i) a set of hosts, (ii) a first set of logical networks, each logical network in the first set comprising a set of VMs of one tenant in a plurality of tenants, and (iii) a second set of logical networks, each logical network in the second set comprising a set of VMs of one service in a set of services, the method comprising:
    at a host in the set of hosts, intercepting a packet sent by a tenant VM of a first logical network to a VM of a second logical network, the packet comprising a source network address and a source port number associated with the tenant VM, the packet intercepted prior to leaving a physical forwarding element in the host, the physical forwarding element for receiving packets from and sending packets to the VMs hosted on the host;
    at the host, replacing the source network address and the source port number in the packet with a replacement network address and port number pair from a set of replacement network address and port number pairs allocated to the host for accessing service VMs, each pair for uniquely identifying a VM across the plurality of the tenant logical networks; and
    sending the packet through the physical forwarding element to the VM of the second logical network.

6. The method of claim 5, wherein the host is a first host, wherein the VM of the second logical network is hosted on a second host different than the first host, wherein sending the packet to the VM of the second logical network comprises sending the packet through a tunnel between the host of the first and second hosts.

7. The method of claim 5, wherein the intercepted packet further comprises a media access control (MAC) address of a network address translation (NAT) gateway associated with the first logical network, the method further comprising replacing the MAC address of the gateway in the packet with a MAC address of the VM of the second logical network to prevent the physical forwarding element in the host from forwarding the packet to the NAT gateway.

8. The method of claim 5, wherein replacing the source network address and the port number of the packet comprises determining that the combination of the replacement network address and the replacement port number has not been used by another tenant VM in an ongoing communication session.

9. The method of claim 8 further comprising marking the replacement network address and the replacement port number, which are used to replace the source network address and port number, as unavailable for use by any other tenant VMs.

10. The method of claim 9 further comprising:
determining that a predetermined amount of time has elapsed since the replacement network address was assigned to the tenant VM; and
marking the replacement network address and the replacement port number as available for use by any other tenant VMs.

11. The method of claim 9 further comprising:
determining that a session between the tenant VM and the VM of the second logical network is no longer valid based on an explicit inspection of a tear down message on a transport layer; and
marking the replacement network address and the replacement port number as available for use by any other tenant VMs.

12. The method of claim 5 further comprising:
receiving a first set of rules for forwarding packets from VMs of a first logical network comprising a set of tenant VMs to VMs of a second logical network comprising a set of service VMs;
receiving a set of parameters associated with the VMs of the second logical network; and
prior to intercepting the packet, translating the set of parameters and the first set of rules into a second set of rules, the second set of rules identifying all possible pairs of the VMs of the first logical network that are hosted on said host and the VMs of the second logical network.

13. The method of claim 5, wherein the VM of the second logical network is hosted on said host, wherein sending the packet to the second logical network comprises sending the packet through the physical forwarding element of the host without going through a network address translation (NAT) gateway.

14. The method of claim 5 further comprising:
at the host, receiving a reply packet from the VM of the second logical network addressed to the replacement network address and replacement port number;
replacing the replacement network address in the reply second packet with said source network address and the replacement port with said source port number of the tenant VM; and
delivering the reply packet to the tenant VM.

15. The method of claim 14 further comprising:
at a host of said VM of the second logical network, intercepting an address resolution protocol (ARP) message requesting a media access control (MAC) address corresponding to said replacement network address; and
responding to the ARP message with a replacement MAC address, the replacement MAC address a unique MAC address in the network.

16. The method of claim 15, wherein the reply packet comprises the replacement MAC address as the destination MAC address, the method further comprising:
at a physical forwarding element on the host of the VM of the second logical network, receiving the reply packet;
determining that the destination MAC address in the reply packet is the replacement MAC address; and
forwarding the reply packet to an uplink of the host of the service VM.

17. The method of claim 16 further comprising:
encapsulating the packet at the uplink;
identifying the tunnel established between the hosts of the tenant and service VMs; and
forwarding the reply packet through the tunnel to the host of the tenant VM.

18. For a host machine that hosts at least one tenant virtual machine (VM) of a first logical network that accesses service VMs of a second logical network, a method comprising:
prior to a packet leaving a physical forwarding element on the host, intercepting the packet sent by the tenant VM to one of the service VMs based on a set of forwarding rules, the packet comprising a source network address of the tenant VM and a source port number of the tenant VM;
prior to the packet leaving the physical forwarding element in the host, replacing the source network address and source port number with a replacement network address and port number pair from a set of replacement network address and port number pairs allocated to the host for accessing service VMs, each replacement network address and port number pair for uniquely identifying a tenant VM across the first and second sets of logical networks; and
providing the modified packet to the physical forwarding element for forwarding the modified packet to the service VM.

19. The method of claim 18 further comprising:
at the host, receiving a reply packet from the service VM addressed to the replacement network address and the replacement port number of the tenant VM;
replacing the replacement network address in the reply second packet with said source network address and the replacement port with said source port number of the tenant VM; and
delivering the reply packet to the tenant VM.

20. The method of claim 19, wherein the intercepted packet further comprises a media access control (MAC) address of a network address translation (NAT) gateway associated with the host, the method further comprising replacing the MAC address of the gateway in the packet with a MAC address of the service VM to prevent the physical forwarding element in the host to forward the packet to the NAT gateway.

* * * * *